United States Patent
Wu et al.

(10) Patent No.: US 12,311,597 B2
(45) Date of Patent: May 27, 2025

(54) ADDITIVE MANUFACTURING SYSTEM AND UNIFIED ADDITIVE-DEFORMATION-MACHINING (ADM) PROCESS OF MANUFACTURING

(71) Applicant: Wayne State University, Detroit, MI (US)

(72) Inventors: Xin Wu, Canton, MI (US); Qingyu Yang, Canton, MI (US); Ahmed Nabil Elalem, Dearborn Heights, MI (US)

(73) Assignee: Wayne State University, Detroit, MI (US)

( * ) Notice: Subject to any disclaimer, the term of this patent is extended or adjusted under 35 U.S.C. 154(b) by 0 days.

(21) Appl. No.: 18/122,921

(22) Filed: Mar. 17, 2023

(65) Prior Publication Data

US 2023/0294357 A1 Sep. 21, 2023

Related U.S. Application Data

(60) Provisional application No. 63/321,377, filed on Mar. 18, 2022.

(51) Int. Cl.
  *B29C 64/188* (2017.01)
  *B22F 10/22* (2021.01)
  (Continued)

(52) U.S. Cl.
  CPC ............ *B29C 64/188* (2017.08); *B22F 10/22* (2021.01); *B22F 10/38* (2021.01); *B29C 59/02* (2013.01);
  (Continued)

(58) Field of Classification Search
  CPC .......... B23P 15/00; B23P 23/04; B22F 12/20; B22F 12/84; B22F 12/90; B22F 10/22;
  (Continued)

(56) References Cited

U.S. PATENT DOCUMENTS

| 10,385,432 B2 | 8/2019 | Kilmer |
| 10,395,372 B2 | 8/2019 | Anand |

(Continued)

FOREIGN PATENT DOCUMENTS

| CA | 3011483 C | 7/2017 |
| CN | 106738888 A * | 5/2017 |

(Continued)

OTHER PUBLICATIONS

CN 106738888 with English trnaslation. (Year: 2017).*

(Continued)

*Primary Examiner* — Moshe Wilensky
(74) *Attorney, Agent, or Firm* — Fishman Stewart PLLC

(57) ABSTRACT

An additive manufacturing system may include a stage, a toolhead adjustable relative to the stage, an additive manufacturing unit (AM unit) adjustably connected to the toolhead, a mechanical unit adjustably connected to the toolhead, and a controller operatively connected to the toolhead, the AM unit, and the mechanical unit. The AM unit may be configured to perform an application subprocess of a unified additive-deformation-machining (ADM) process. The mechanical unit may be configured to perform a deformation subprocess of the unified ADM process. The controller may be configured to control the toolhead, the AM unit, and the mechanical unit and to coordinate performance of the application subprocess and the deformation subprocess during the unified ADM process to produce a metal additive manufactured product having at least one of a desired property and a desired characteristic.

17 Claims, 11 Drawing Sheets

(51) Int. Cl.
  *B22F 10/38* (2021.01)
  *B29C 59/02* (2006.01)
  *B29C 64/227* (2017.01)
  *B29C 64/245* (2017.01)
  *B29C 64/314* (2017.01)
  *B29C 64/393* (2017.01)
  *B33Y 10/00* (2015.01)
  *B33Y 30/00* (2015.01)
  *B33Y 40/10* (2020.01)

(52) U.S. Cl.
  CPC .......... *B29C 64/227* (2017.08); *B29C 64/245* (2017.08); *B29C 64/314* (2017.08); *B29C 64/393* (2017.08); *B33Y 10/00* (2014.12); *B33Y 30/00* (2014.12); *B33Y 40/10* (2020.01)

(58) Field of Classification Search
  CPC .......... B22F 10/25; B22F 10/38; B22F 10/50; B33Y 40/00; B33Y 40/10; B33Y 10/00; B33Y 30/00; B29C 59/02; B29C 64/314; B29C 64/393; B29C 64/188; B29C 64/227; B29C 64/245
  See application file for complete search history.

(56) References Cited

U.S. PATENT DOCUMENTS

| | | |
|---|---|---|
| 2011/0293840 A1 | 12/2011 | Newkirk |
| 2017/0304933 A1 | 10/2017 | Miles |
| 2019/0217417 A1* | 7/2019 | Wu ........................ B23K 26/034 |
| 2022/0203613 A1* | 6/2022 | Fischer ................. B29C 64/209 |

FOREIGN PATENT DOCUMENTS

| | | |
|---|---|---|
| CN | 109530880 A | 3/2019 |
| CN | 112621221 A | 4/2021 |
| CN | 113477927 A | 10/2021 |
| DE | 102016111047 B3 | 10/2017 |
| EP | 3511095 A1 | 7/2019 |

OTHER PUBLICATIONS

L. Liu et al., "Tailoring the microstructure and mechanical properties of wire and arc additive manufactured Al—Mg alloy via interlayer friction stir processing," Journal of Materials Research and Technology, 2023, 25:1055-1068.

Changshu He, Jingxun Wei, Ying Li, Zhiqiang Zhang, Ni Tian, Gaowu Qin, Liang Zuo. Improvement of microstructure and fatigue performance of wire-arc additive manufactured 4043 aluminum alloy assisted by interlayer friction stir processing[J]. J. Mater. Sci. Technol., 2023, 133: 183-194.

J. Wei et al., "Achieving high performance of wire arc additive manufactured Mg—Y—Nd alloy assisted by interlayer friction stir processing," Journal of Materials Processing Technology, 2023, vol. 311, 117809, https://doi.org/10.1016/j.imatprotec.2022.117809.

Mofan Qie et al., "Microstructure evolution and mechanical properties of wire-arc additive manufactured AleZneMgeCu alloy assisted by interlayer friction stir processing," Journal of Materials Research and Technology, 2023, 24: 2891-2906.

A V Gusarova et al., "Modification of the Material Structure Produced by the Electron-Beam Additive Manufacturing by the Subsequent Friction Stir Processing," International Science and Technology Conference (FarEastCon 2020), IOP Conf. Series: Materials Science and Engineering 1079 (2021) 042009, IOP Publishing. doi:10.1088/1757-899X/1079/4/042009.

Andrey Chumaevskii, Kseniya Osipovich, Kirill Kalashnikov, Aleksandr Panfilov, Anastasiya Gusarova, and Evgeny Knjazhev, Hardening of Aluminium Alloy 5556 and Copper C11000 Obtained by the Additive Electron-Beam Method with the Following Friction Stir Processing, 7th International Congress on Energy Fluxes and Radiation Effects (EFRE) 4th International Conference on New Materials and High Technologies-Tomsk—2020 978-1-7281-2686-9/20/$31. 00 © 2020 IEEE.

M. Tawfik, M. Nemat-Alla, M. Dewidar, Enhancing the properties of aluminum alloys fabricated using wire + arc additive manufacturing technique—A review. Journal of materials research technology, 13 (2021), pp. 754-768.

P.A. Colegrove, J. Donoghue, F. Martina, J. Gu, p. Prangnell, J. Honnige, Application of bulk deformation methods for microstructural and material property improvement and residual stress and distortion control in additively manufactured components, Scripta Materialia, 135 (2017), pp. 111-118.

J.R. Honnige, P. Colegrove, S. Williams, Improvement of microstructure and mechanical properties in wire + arc additively manufactured Ti—6Al—4V with machine hammer peening, Procedia engineering, 216 (2017), pp. 8-17.

J. Gu, J. Ding, S.W. Williams, H. Gu, J. Bai, Y. Zhai, P. Ma, The strengthening effect of inter-layer cold working and post-deposition heat treatment on the additively manufactured Al—6.3%Cu alloy, Materials Science and Engineering: A, 651 (2016), pp. 18-26.

International Search Report, PCT/US2023/015497, dated Jun. 30, 2023.

* cited by examiner

ADDITIVE MANUFACTURING SYSTEM AND UNIFIED ADDITIVE-DEFORMATION-MACHINING (ADM) PROCESS OF MANUFACTURING

CROSS-REFERENCE TO RELATED APPLICATIONS

This application claims priority to U.S. Provisional Patent Application No. 63/321,377, filed on Mar. 18, 2022, the contents of which is hereby incorporated by reference in its entirety.

TECHNICAL FIELD

The exemplary illustrations described herein are generally directed to an additive manufacturing system and a unified additive-deformation-machining (ADM) process of manufacturing performed by the system.

BACKGROUND

Traditional manufacturing of metal products may include many separate/individual processes and equipment that typically result in long process cycle times. For example, manufacturing a metal product traditionally includes mining, iron/steel making, casting, plastic deformation, subtractive machining (e.g., cutting, grinding, etc.), and/or additive machining (e.g., welding, joining, etc.). Additionally, the metal will commonly undergo a series of deformation processes (e.g., hot and cold rolling, forging, drawing, extrusion, etc.) to break down the microstructure of the metal and form a different microstructure. These processes are important for producing a metal product having the desired shape and properties/characteristics.

Manufacturing processes, which convert raw materials to final products, are commonly grouped in three categories as of additive, subtractive and net-shape forming. Additive manufacturing (AM), such as 3D printing for example, uses local melting-solidification or local solid-state joining method to form 3D final products without many intermediate steps and with maximum geometry flexibility. A variety of polymers and metals/alloys have been successfully utilized in AM processes. However, not all metals and/or alloys can be utilized in AM processes and the quality of AM metal products is inconsistent.

AM of polymers involves conversion of a polymer material from an initial wire form to a 3D product shape by melting the wire from solid to viscous liquid phases and nature cooling back to solid, to complete a physical cycle without chemical reaction. In contrast, AM of metals is a far more complex process involving not only first-order phase transformation (solid-liquid-solid), but many second-order phase transformations and, in many cases, physical and/or chemical reactions. This in turn may result in the formation of metastable phases having a wide range of microstructures and properties. As such, the production of metal components via AM (e.g., 3D printing) faces great challenges not only in the process control for obtaining repeatable shapes and surfaces, but in obtaining a desired metal microstructure.

The difficulty in obtaining the desired metal microstructure is fundamentally due to the complex metallurgical and thermal processes involved in the metal/alloy melting and solidification process. For example, AM of metals typically involves melting one or more feed metals, depositing a molten pool of the feed metal(s) under various energy sources (commonly use laser beam and electron beam), followed by cooling/solidification of the deposited molten metal. This metal melting-solidification process involves complex chemical and physical metallurgical processes. Due to complex chemical metallurgy, the AM process may not produce the desired alloy even when the feed materials have the desired chemical composition. Additionally and/or alternatively, the melting-solidification process results in the final product having a dendritic cast microstructure of large grain size, bounded by a heat affected zone, with poor strength and ductility. A dendritic cast microstructure is commonly considered to be brittle and weak and, generally, is not a favorable microstructure. Additionally, the volume change during cooling and solidification may generate microcracks (e.g., may cause thermal cracking), porosities, chemical segregation, and/or other defects. The AM metal product may be subjected to thermal processes to reduce these defects and, to the extent possible, mitigate the problems caused thereby.

Moreover, the metal products produced by AM processes generally have a rough surface finish and conventional AM processes are often unable to produce desired surface finishes. AM processes are also often unable to produce a final metal product within the dimensional tolerances necessary for many applications. As such, AM metal products may require additional machining to address these shortcomings. This not only increases production time and costs, but can be particularly problematic when an area of the final product that needs to be machined is inaccessible by machining tools.

Thus, there is a need: to convert raw material, specially metals/alloys, to a final product with flexible 3D shapes; to produce metals/alloys of targeted chemical compositions and microstructures, crystallographic phase(s) and grain structures, which are developed through chemical, physical and mechanical metallurgies based on thermodynamics or an energy principle—thus to obtain desired functions and properties for specific applications; to produce distributed microstructures, either uniform or controlled non-uniform/gradient microstructure, depending on the function requirement, including a controlled distribution (gradient) of chemical composition, microstructure and function/properties over locations, and moreover, capable to add particulate or short fiber reinforcements to form composites; to eliminate processing-induced defects such as inclusions, cavities, microcracks through plastic deformation; and to provide satisfactory surface finish and dimensional precision through machining, for products used in but not limited to auto/transportation and its suppliers, medical devices, electrical and electronic industries, the communication industry, the energy industry, the machinery industry, and the appliance industry, as examples, when metal or composite parts are needed.

SUMMARY

In examples, an additive manufacturing system may include a stage, a toolhead adjustable relative to the stage, an additive manufacturing unit (AM unit) adjustably connected to the toolhead, a mechanical unit adjustably connected to the toolhead, and a controller operatively connected to the toolhead, the AM unit, and the mechanical unit. The AM unit may be configured to perform an application subprocess of a unified additive-deformation-machining (ADM) process. The mechanical unit may be configured to perform a deformation subprocess of the unified ADM process. The controller may be configured to control the toolhead, the AM unit, and the mechanical unit and to coordinate performance of the application subprocess and the deformation subprocess during the unified ADM process to produce a metal additive manufactured product having at least one of a desired property and a desired characteristic.

In examples, a method of additively manufacturing a metal product may include producing a bead of material along at least a portion of a planned path via performing an application subprocess of a unified additive-deformation-machining (ADM) process. The method may also include deforming a material of the bead via performing a deformation subprocess of the ADM process to modify at least one of a characteristic and a property of the material of the bead. Additionally, the method may include coordinating performance of the application subprocess and the deformation subprocess during the ADM process to produce a product having at least one of a desired property and a desired characteristic.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and are not restricted to the precise form and configuration shown in the drawings or disclosed in the following detailed description. Exemplary illustrations are described in detail by referring to the drawings as follows:

DETAILED DESCRIPTION

Figure 1:
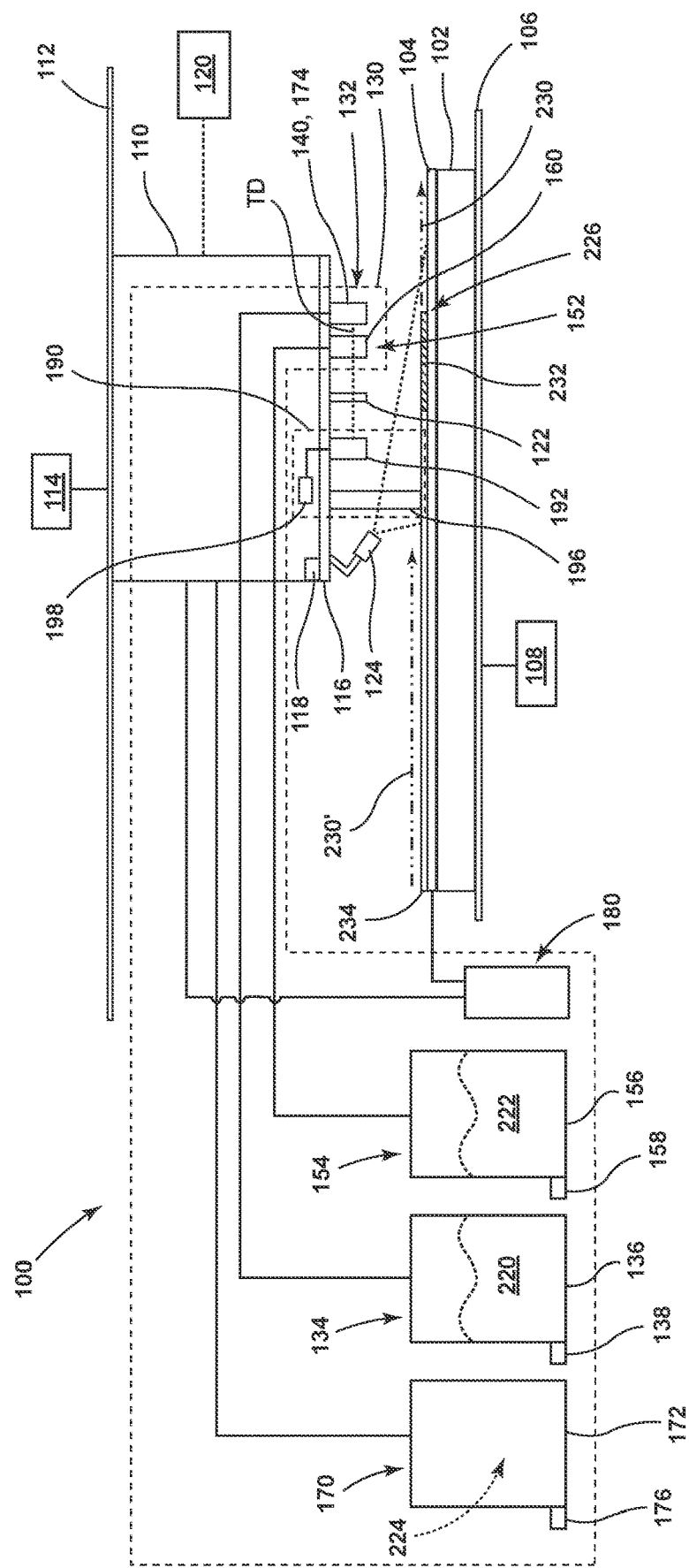
FIG. 1 illustrates an AM system according to the disclosure.

In the drawings, where like numerals and characters indicate like or corresponding parts throughout the several views, exemplary illustrates are shown in detail. The various features of the exemplary approaches illustrated and described with reference to any one of the figures may be combined with features illustrated in one or more other figures, as it will be understood that alternative illustrations that may not be explicitly illustrated or described may be able to be produced. The combinations of features illustrated provide representative approaches for typical applications. However, various combinations and modifications of the features consistent with the teachings of the present disclosure may be desired for particular applications or implementations.

The disclosed additive manufacturing (AM) system has the unique capability of performing a unified additive-deformation-machining (ADM) process of manufacturing that is capable of producing metal AM products with properties and/or characteristics (e.g., microstructure, crystallographic phase(s), grain structure, grain size, chemical composition, strength, hardness, ductility, surface finish/roughness) that could not be obtained using previous manufacturing systems and properties. The unified ADM process is a single process or method of manufacturing that involves the coordinated performance of (i) an application subprocess via which material is applied to a workpiece and melted to form a molten pool of applied material, (ii) a deformation subprocess via which the applied material is deformed to provide the material with the desired properties and/or characteristics, and (iii) a machining subprocess via which the deformed material is machined to, for example, achieve a desired geometry and/or surface finish. The AM system and unified ADM process are highly adjustable and customizable thus enabling the production of metal AM products having different properties and characteristics that can be selected and/or adjusted as desired. For example, the type, shape, and composition of the feed material and/or the supplemental material, the type of AM unit and various application parameters, the type of melting mechanism and various melting parameters, the type of deformation tools and various deformation parameters, the positions of various components of the AM system, among many other components, variables, and parameters, can be adjusted and/or modified to achieve a wide array of different properties and characteristics. The AM system also determines and/or recommends optimal parameters for producing a metal AM product with desired characteristics and properties based on one or more user inputs. For example, a user may input information related to the AM system and/or a metal AM product to be produced thereby and, based on this information, the AM system determines one or more optimal parameters to produce the metal AM product with the desired characteristics and properties. The AM system may, in turn, utilize these determined parameters to coordinate performance of the application subprocess, the deformation subprocess, and the machining subprocess during the unified ADM process. Moreover, the AM system actively monitors the unified ADM process and may automatically and/or dynamically adjust one or more parameters to ensure the desired properties and characteristics are achieved or to provide various regions or sections of the metal AM product with different properties and/or characteristics (e.g., a metal AM product with a harder exterior region surrounding a softer core).

Referring now to FIGS. 1-4, an exemplary additive manufacturing (AM) system 100 for performing a unified additive-deformation-machining (ADM) process of manufacturing is shown. The AM system 100 includes a stage 102, a toolhead 110, a controller 120, a cooling mechanism 122, 888217and a temperature detection mechanism 124, an additive manufacturing unit (AM unit) 130, and a mechanical unit 190.

The stage 102 is a platform, surface, or mechanism that supports a workpiece 104 on which an AM product is formed. In the illustrative examples, of FIGS. 1-4, the stage 102 is connected to and/or mounted on a stage track assembly 106. The stage 102 is adjustable and/or movable relative to the toolhead 110 via actuating a stage actuator 108 to move and/or adjust the stage 102 along the stage track assembly 106. Alternatively, the stage 102 is not movable and remains substantially stationary.

As generally illustrated in FIGS. 1-4, the toolhead 110 supports and positions one or more other components of the AM system 100 adjacent to the stage 102. In the illustrative examples in FIGS. 1-4, the toolhead 110 is connected to and/or mounted on a toolhead track assembly 112. The toolhead 110 is adjustable relative to the stage 102 via actuating a toolhead actuator 114 (e.g., a motor) to move and/or adjust the toolhead 110 along the toolhead track assembly 112. Alternatively, the toolhead 110 is not movable and remains substantially stationary.

The toolhead 110 includes a track assembly 116 to which one or more components are adjustably connected. The track assembly 116 includes a plurality of tracks and/or rails and one or more actuators 118. The components connected to the track assembly 116 are each adjustable along (e.g., forward, backward, left, right) one or more of the tracks via one or more the actuators 118.

In the illustrative examples of FIGS. 1-4, the cooling mechanism 122, the temperature detection mechanism 124, a deformation tool 192 of the mechanical unit 190, a machining tool 196 of the mechanical unit 190, a feed material applicator 140 of the AM unit 130, a supplemental material applicator 160 of the AM unit 130, a melting mechanism 180 of the AM unit 130, and a gas nozzle 174 are each adjustably connected to one or more tracks of the track assembly 116 and, thus, are adjustably connected to the toolhead 11. These components 122, 124, 140, 160, 174, 180, 192, 196 are adjustable and/or moveable along one or more respective tracks of the track assembly 116 (e.g., individually/separately or in unison) via one or more actuators 118 and the controller 120. As such, these components 122, 124, 140, 160, 174, 180, 192, 196 are adjustable and/or moveable relative to one another, the stage 102, the workpiece 104, and/or one or more portions of the toolhead 110. Conceivably, in some examples, one or more of the components 122, 124, 140, 160, 174, 180, 192, 196 are connected to another portion of the toolhead 110 (e.g., not the track assembly 116) and/or are generally stationary. Generally speaking, relative to a direction in which the feed material 220 is to be applied during operation (also referred to as the application direction herein), the machining tool 196 is disposed behind the deformation tool 192, the deformation tool 192 is disposed behind the cooling mechanism 122, which is disposed behind the supplemental material applicator 160, which is disposed behind the feed material applicator 140. The position of the components 122, 140, 160 192, 196 relative to one another and the respective distance between each of the components 122, 140, 160 192, 196 is adjustable via the controller 120 actuating one or more of the actuators 118 to move one or more of the components 122, 140, 160 192, 196 along one or more respective tracks of the track assembly 116.

The controller 120 is operatively and/or communicatively connected to the stage 102, the toolhead 110, the cooling mechanism 122, the temperature detection mechanism 124, the AM unit 130, the mechanical unit 190, one or more actuators 108, 114, 118, 138, 158, 198, and/or one or more portions thereof.

The controller 120 is configured to receive one or more user inputs related to the AM system 100 and/or a metal AM product to be produced thereby. The one or more user inputs may include a composition and/or type of the feed material 220, a composition and/or type of the supplemental material 222, a geometry of the metal AM product, a file including a design of the metal AM product (e.g., a STL file, a VRML file), and/or one or more desired characteristics and/or properties of the metal AM product (e.g., microstructure, crystallographic phase(s), grain structure, grain size, chemical composition, strength, hardness, ductility, surface finish/roughness).

Based at least on one or more of the user inputs, the controller 120 is configured to determine one or more (e.g., optimal) parameters to produce the metal AM product. The controller 120 may also be configured to recommend the determined parameters to the user for review and confirmation. The controller 120 utilizes control algorithms and information and/or data (e.g., testing results) from one or more sources to determine the parameters. The controller 120 may also, in at least some examples, utilize machine learning and/or artificial intelligence to integrate and synthesize the collected information and data to facilitate and/or improve the determination of parameters.

The parameters determined by the controller 120 may include one or more application parameters (e.g., the AM unit line speed, feed speed for the feed material 220, feed speed for the supplemental material 222), one or more melting parameters (e.g., voltage, current, beam geometry, beam orientation), one or more deformation parameters (e.g., deformation temperature range, trail distance TD, cooling rate of the molten material pool 232, strain, strain rate, deformation tool geometry, plunge depth, deformation tool rotational speed, deformation tool line speed), one or more machining parameters (e.g., machining temperature range, machining tool rotational speed, machining tool line speed, machining tool pressure), and other variables and parameters commonly involved in known AM processes, material deformation processes, and/or machining processes. For example, the controller 120 is configured to determine the temperature range at which the material of the bead 234 should be deformed to achieve the desired properties and/or characteristics (also referred to as the deformation temperature range herein). The controller 120 may determine the deformation temperature range based on one or more factors such as the desired properties and/or characteristics, the composition of the material of the bead 234, and the type of deformation tool 192. The controller 120 is also configured to determine and/or calculate what the distance between the deformation tool 192 and the feed material applicator 140 (e.g., the trail distance TD) should be for the temperature of the material of the bead 234 to be within the deformation temperature range when it is deformed by the deformation tool 192. The controller 120 may determine the trail distance based on one or more factors including but not limited to the composition of the material of the bead 234, the determined deformation temperature range, the cooling rate of the molten material pool 232, the environmental temperature, the feed material applicator line speed, and/or the deformation tool line speed. As an extremely simplified example, if the feed material applicator 140 and the deformation tool 192 both move at a speed of 1 cm/s, the material of the bead 234 reaches the deformation temperature range 3 seconds after application of the feed material 220, and the material of the bead 234 remains within the deformation temperature range for 2 seconds, the trail distance TD would be around 4 centimeters (or anywhere else between 3 cm and 5 cm) so that the deformation tool 192 deforms material of the bead 234 roughly 4 seconds after it was applied and, thus, is within the deformation temperature range. In this manner, the controller 120 may coordinate performance of the application subprocess and the deformation subprocess based on the determined parameters to produce a metal AM product with the desired characteristics and properties.

The controller 120 is further configured to operate and control the AM system 100 (e.g., according to the determined parameters) to perform a unified ADM process and produce the metal AM product with the desired characteristics and properties. More specifically, the controller 120 is configured to control and operate the stage 102, the toolhead 110, the cooling mechanism 122, the temperature detection mechanism 124, the AM unit 130, the mechanical unit 190, and/or one or more portions thereof (e.g., according to the determined parameters), and to coordinate the operation, functions, and/or subprocesses performed by these components during the unified ADM process. For example, the controller 120 may coordinate performance of the application subprocess, the deformation subprocess, and the machining subprocess during the unified ADM process based on the determined parameters (e.g., coordinating the application subprocess and the deformation subprocess so that the material of the bead 234 is deformed when it's temperature is within the deformation temperature range). The controller 120 is configured to actively monitor the unified ADM process and may automatically and dynamically adjust one or more of the determined parameters to ensure the desired properties and characteristics are achieved or to provide various portions or regions of the metal AM product being produced with different properties and/or characteristics (e.g., a metal AM product with a harder exterior region surrounding a softer core region, a metal AM product having a microstructure gradient). The controller 120 is also configured to adjust the position of various components of the AM system 100 (e.g., the stage 102, the toolhead 110, the cooling mechanism 122, the temperature detection mechanism 124, the AM unit 130, the feed material applicator 140, the supplemental material applicator 160, the mechanical unit 190, the deformation tool 192, the machining tool 196) such as by actuating one or more actuators 108, 114, 118, 198 (e.g., to move one or more components along the associated track assembly 106, 112, 116).

The AM unit 130 is a device or group of components configured to perform one or more AM processes (e.g., during an application subprocess of the unified ADM process), such as powder bed fusion (PBF), binder jetting, sheet lamination, and direct energy deposition (DED). For example, the AM unit 130 may be configured as a laser beam unit, an electron beam unit, a metal inert gas (MIG) unit, a tungsten inert gas (TIG) unit, etc. The AM unit 130 includes a feed mechanism 132, a supplemental feed mechanism 152, a melting mechanism 180, and a gas source 170, which are described in further detail below. The feed mechanism 132 includes a material feeder 134, which includes a retainer 136 and a feed material actuator 138, and a feed material applicator 140. The supplemental feed mechanism 152 includes a supplemental material feeder 154, which includes a supplemental material retainer 156 and a supplemental material actuator 158, and a supplemental material applicator 160. The gas source 170 includes a gas retainer 172 and a pump 176, and may also include a gas nozzle 174. The melting mechanism 180 may include a ground 182, a voltage source 186, an electrode 188, and/or a beam emitter 180'.

The feed mechanism 132 is a device or group of components configured to retain and/or apply a feed material 220 during the application subprocess. In some examples, such as the system 100 of FIGS. 2, 3, and 6, the feed mechanism 132 is configured to hold a feed material 220 (e.g., a feed material wire 220") and to position a free end of the feed material 220" at a desired location (e.g., on and/or adjacent to the workpiece 104 and/or a previously applied layer 236 of material) for melting (also referred to as a melting zone 226) via the melting mechanism 180. In other examples, such as the AM system 100 of FIG. 4, the feed mechanism 132 is configured to retain, supply, and apply a feed material 220 (e.g., a feed material powder 220') to a desired location on the workpiece 104 and/or a previously applied layer 236 of material for melting (e.g., a melting zone 226) via the melting mechanism 180. The feed mechanism 132 includes a material feeder 134 and a feed material applicator 140 described further below. While the feed mechanism 132 in the illustrative examples of FIGS. 1-4 and 6 includes a single material feeder 134 and a single feed material applicator 140, the feed mechanism 132 may alternatively include a plurality of material feeders 134 and/or a plurality of feed material applicators 140 that are compatible with and/or configured to utilize different types of feed materials 220 or the same type of feed material 220.

The feed material 220 may be a body (e.g., a wire, rod, member) or particulate (e.g., powder) composed of one or more metals and/or other components. For example, the feed material 220 is a feed material wire 220" in the system 100 of FIGS. 2, 3, and 6, and is a feed material powder 220' in the system 100 of FIG. 4. The feed material 220 may be a metal, alloy, and/or a metal-based compound. The feed material 220 may have a composition that is identical to the desired composition of the metal AM product. Alternatively, when the metal AM product is to be composed of an alloy or other compound for example, the feed material 220 may be composed of one or more metals and/or alloys and may be combined with one or more supplemental materials 222 to produce the desired composition of the metal AM product.

The material feeder 134 is configured to retain a supply of feed material 220. Additionally, the material feeder 134 is configured to supply, feed, etc. the retained feed material 220 to the feed material applicator 140. The material feeder 134 is operatively and/or communicatively connected to the feed material applicator 140 (e.g., via a tube, passage, etc. through which a feed material powder 220' and/or a feed material wire 220" may pass), such that the feed material 220 is suppliable, feedable, etc. from the material feeder 134 to the feed material applicator 140. The material feeder 134 includes a retainer 136 that retains a supply of feed material 220 and a feed material actuator 138 that provides, supplies, advances, etc. the feed material 220 from the retainer 136 to the feed material applicator 140. In at least some examples, such as the illustrative AM system 100 of FIGS. 2 and 3, the material feeder 134 is a spool feeder 134', the retainer 136 is a spool 136" that retains a supply of feed material wire 220", and the feed material actuator 138 is a motor 138" operatively connected to the spool 136" and configured to adjust (e.g., rotate) the spool 136" to provide, supply, advance, etc. the feed material wire 220" to the feed material applicator 140 (e.g., a probe holder 140"). In at least some other examples, such as the illustrative system of FIG. 4, the retainer 136 is a container 136', tank, bag, etc. that retains a volume of feed material powder 220' and the feed material actuator 138 is a pump 138', conveyor, or other mechanism that provides, supplies, flows, etc. the feed material powder 220' to the feed material applicator 140 (e.g., a feed material nozzle 140'). The material feeder 134, the retainer 136, and/or the feed material actuator 138 may alternatively be configured in other suitable manners, including those generally known in the art.

The feed material applicator 140 is configured to position and/or apply a feed material 220 at a desired location. In the illustrative example of FIGS. 2, 3, and 6-8, the feed material applicator 140 is a probe holder 140" configured to hold a portion of feed material wire 222" and/or position the held feed material wire 220" (e.g., a free end thereof) at a desired location on and/or adjacent to the workpiece 104 and/or a previously applied layer 236 of material. In the illustrative examples of FIG. 4, the feed material applicator 140 is a feed nozzle 140' configured to spray, deposit, apply, add, etc. a feed material 220 (e.g., a feed material powder 220') to a desired location on the workpiece 104 and/or a previously applied layer 236 of material. The feed material applicator 140 may alternatively be configured in other suitable manners, including those generally known in the art.

The supplemental feed mechanism 152 is a device or group of components configured to retain and/or apply a supplemental material 222 during the application subprocess. In some examples, such as the system 100 of FIGS. 2, 4, and 6, the supplemental feed mechanism 152 is configured to retain, supply, and apply a supplemental material 222 (e.g., a supplemental material powder 222') to a desired location (e.g., the melting zone 226, the molten material pool 232). In other examples, such as the system 100 of FIG. 3, the supplemental feed mechanism 152 is configured to hold a supplemental material 222 (e.g., a supplemental material wire 222") and to position a free end of the supplemental material 222" at a desired location (e.g., in the melting zone 226), such as for melting via the melting mechanism 180. The supplemental feed mechanism 152 includes a supplemental material feeder 154 and a supplemental material applicator 160. While the supplemental feed mechanism 152 in the illustrative examples of FIGS. 1-4 and 6 includes a single supplemental material feeder 154 and a single supplemental material applicator 160, the supplemental feed mechanism 152 may alternatively include a plurality of supplemental material feeders 154 and a plurality of supplemental material applicators 160 that are compatible with and/or configured to utilize different types of supplemental materials 222 or the same type of supplemental material 222.

The supplemental material 222 may be a body (e.g., a wire, rod, member) or powder (e.g., particulate, fibers, or a mixture thereof) composed of one or more metals and/or other components that is combined with the feed material 220 (e.g., added to the molten material pool 232, melted in conjunction with the feed material 220) during the application subprocess. For example, the supplemental material 222 may be a metal powder that is added to the feed material 220 (e.g., when it is a molten material pool 232) to produce the desired metal composition (e.g., an alloy) for the metal AM product. In other examples, the supplemental material 222 may be configured as a composite reinforcement powder (e.g., including particulate, fibers, and/or short fiber metal matrix composites, etc.) that reinforces and/or strengthens the feed material 220 to enhance one or more properties of the metal AM product. The supplemental material 222 is a supplemental material powder 222' in the AM system 100 of FIGS. 2, 4, and 6, and is a supplemental material wire 222" in the system 100 of FIG. 3. The supplemental material 222 generally has a composition (e.g., a second composition) that is different from the composition of the feed material 220 (e.g., the feed material 220 has a first composition and the supplemental material 222 has a different, second composition). Nevertheless, the feed material 220 and the supplemental material 222 may also have the same composition. The supplemental material 222 and the feed material 220 may be the same type of material (e.g., both the feed material 220 and the supplemental material 222 may be powders 220', 222' or wires 220", 222") or different types of materials (e.g., the feed material 220 may be a feed material wire 220" and the supplemental material 222 may be a supplemental material powder 222').

The supplemental material feeder 154 is a device or group of components configured to retain a supply of supplemental material 222. Additionally, the supplemental material feeder 154 is configured to supply, feed, etc. the retained supplemental material 222 to the supplemental material applicator 160. The supplemental material feeder 154 is operatively and/or communicatively connected to the supplemental material applicator 160 (e.g., via a tube, passage, etc. through which a supplemental material powder 222' and/or a supplemental material wire 222" may pass), such that the supplemental material 222 is suppliable, feedable, etc. from the supplemental material feeder 154 to the supplemental material applicator 160. The supplemental material feeder 154 includes a supplemental material retainer 156 that retains a supply of supplemental material 222 and a supplemental material actuator 158 that provides, supplies, advances, etc. the supplemental material 222 from the supplemental retainer 156 to the supplemental material applicator 160. The supplemental material feeder 154, the supplemental material retainer 156, and/or the supplemental material actuator 158 may be configured, structured, and/or arranged in a similar or the same manner as the material feeder 134, the retainer 136, and the feed material actuator 138 of the material feeder 134, respectively.

The supplemental material feeder 154 and the material feeder 134 may be compatible with and/or configured to utilize different types of materials or the same type of material. In the illustrative system 100 of FIG. 2 for example, the material feeder 134 is compatible with and/or configured to utilize a feed material wire 220" (e.g., the material feeder 134 is a spool feeder 134', the retainer 136 is a spool 136", the actuator 138 is a motor 138") and the supplemental material feeder 154 is compatible with and/or configured to utilize a supplemental material powder 222' (e.g., the supplemental material retainer 156 is a container 156' and the supplemental material actuator 158 is a pump 158'). In the illustrative system 100 of FIG. 3, the material feeder 134 is compatible with and/or configured to utilize a feed material wire 220" (e.g., the material feeder 134 is a spool feeder 134', the retainer 136 is a spool 136", the feed material actuator 138 is a motor 138") and the supplemental material feeder 154 is compatible with and/or configured to utilize a supplemental material wire 222' (e.g., the supplemental feeder 154 is a spool feeder 154', the supplemental material retainer 156 is a spool 156", and the supplemental material actuator 158 is a motor 158"). In the illustrative system 100 of FIG. 4, the material feeder 134 is compatible with and/or configured to utilize a feed material powder 220' (e.g., the retainer 136 is a container 136' and the feed material actuator 138 is a pump 138') and the supplemental material feeder 154 is compatible with and/or configured to utilize a supplemental material powder 222' (e.g., the supplemental retainer 156 is a container 156' and the supplemental material actuator 158 is a pump 158').

The supplemental material applicator 160 is configured to position and/or apply a supplemental material 222 at a desired location. In the illustrative example of FIGS. 2, 4, and 6, the supplemental material applicator 160 is a supplemental nozzle 160' configured to spray, deposit, apply, add, etc. one or more supplemental materials 222 (e.g., a supplemental material powder 222') to a desired area, such as to the melting zone 226 and/or the molten material pool 232. In the illustrative example of FIG. 3, the supplemental material applicator 160 is a supplemental probe holder 160'' configured to hold and position a portion of supplemental material 222 (e.g., a supplemental material wire 222'') at a desired location on and/or adjacent to a free end of the feed material wire 220, the workpiece 104, and/or a previously applied layer 236 of material (e.g., in the melting zone 226). The supplemental material applicator 160 may alternatively be configured in other suitable manners, including those generally known in the art.

The gas source 170 is a device or group of components configured to retain and supply a shielding gas 224 during the application subprocess to prevent oxidation at high temperatures. The gas source 170 includes a gas retainer 172 (e.g., a container, tank, etc.) that retains a supply of shielding gas 224, such as an inert gas. The gas retainer 172 is connected to and in fluid communication with a gas nozzle 174 (e.g., via a tube, passage, etc.). A pump 176, conveyor, or other mechanism provides, supplies, flows, etc. the shielding gas 224 from the gas retainer 172 to the gas nozzle 174. The gas nozzle 174 is structured and arranged to spray shielding gas 224 from the gas retainer 172 over a melting zone 226 during the application subprocess. The gas nozzle 174 may be configured as a part, portion, and/or component of the gas source 170, the feed mechanism 132, and/or the toolhead 110. In some examples, at least a portion of the feed mechanism 132 (e.g., a feed material applicator 140), a portion of the feed material 220, and/or a portion of the melting mechanism 180 (e.g., an electrode 188, a nonconsumable arc probe) are arranged at least partially in the gas nozzle 174.

The melting mechanism 180 is a device or group of components configured to provide a high concentration of energy for melting at least a portion of the feed material 220, the supplemental material 222, and/or the workpiece 104 to form a molten material pool 232, which cools to a solidified solid phase forming a bead 234 of material containing the feed material 220 and, optionally, one or more supplemental materials 222. For example, the melting mechanism 180 may be an electrical arc unit, a laser beam unit, an electron beam unit, or other apparatus configured to perform one or more of Laser Melting, Ultrasonic Additive Manufacturing (UAM), Electron Beam Melting (EBM), Plasma Deposition, and Gas Metal Arc Welding (GWAM).

Figure 2:
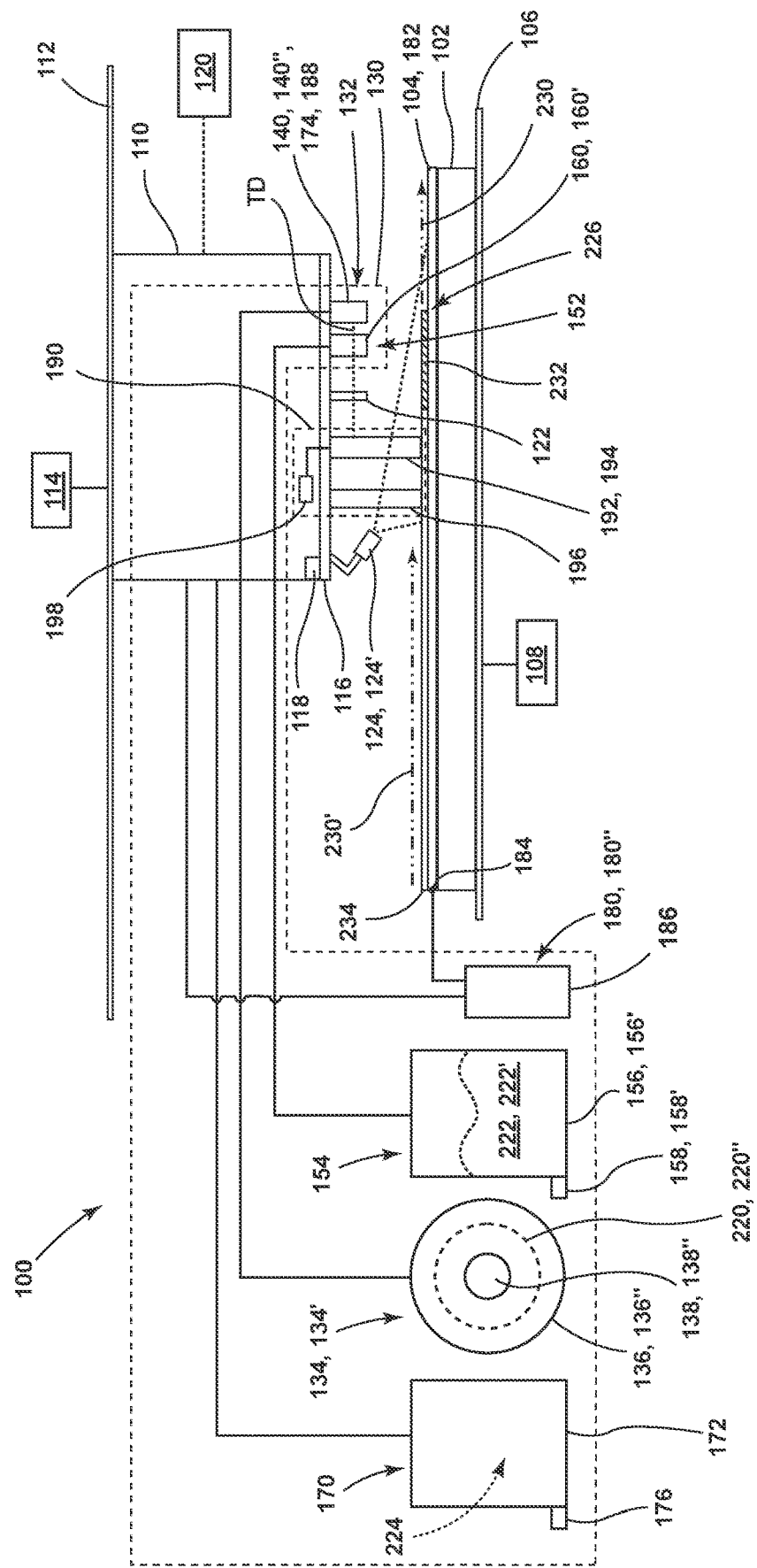
FIG. 2 illustrates an AM system according to the disclosure.
Figure 3:
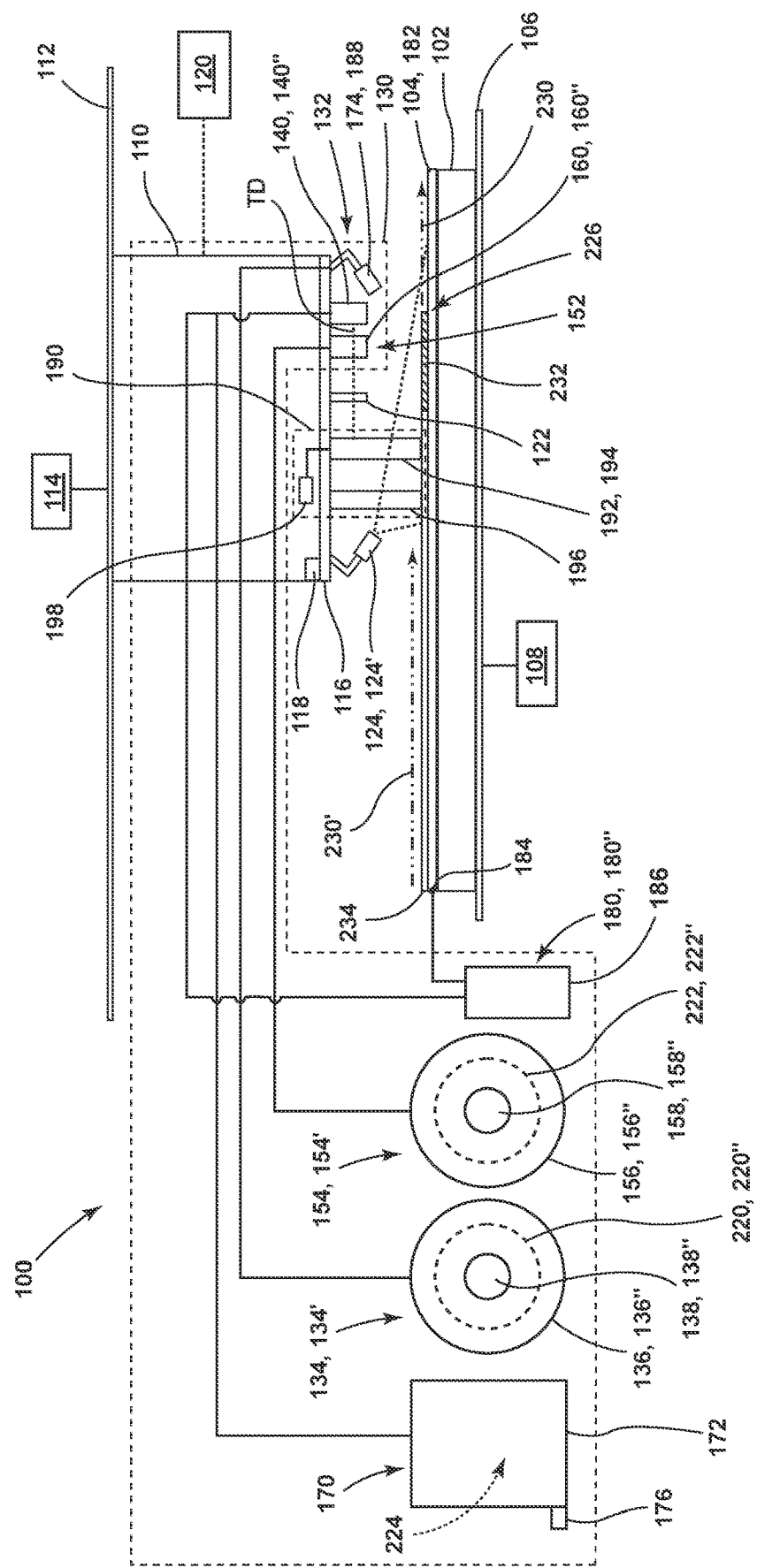
FIG. 3 illustrates an AM system according to the disclosure.

In some examples, such as in the AM system 100 of FIGS. 2 and 3, the melting mechanism 180 is an electrical arc unit 180'' including a ground 182, an electrode 188 disposed in the gas nozzle 174, and a voltage source 186. The voltage source 186 is connected to the electrode 188 and the ground 182, and is configured to supply electricity for generating an arc 238 between the electrode 188 and the ground 182 (see, e.g., FIGS. 7 and 8). The voltage source 186 includes a connector 184 (e.g., a clamp) that releasably engages the workpiece 104, which defines and/or forms the ground 182. In some examples, like the one illustrated in FIGS. 2, 6, and 7 and those in which the AM unit 130 is configured as a MIG unit, the electrode 188 is a consumable arc probe formed and/or defined by the wire feed material 220'' and, along with the feed material applicator 140, is arranged within the gas nozzle 174. In other examples, like the one illustrated in FIGS. 3 and 8 and those in which the AM unit 130 is configured as a TIG unit, the electrode 188 is a nonconsumable arc probe, such as a tungsten wire or rod, that is arranged within the gas nozzle 174 and positioned in the melting zone 226 adjacent to the feed material applicator 140 and/or the supplemental feed material applicator 160.

As generally illustrated in FIGS. 2, 3, and 6-8, during operation of the melting mechanism 180, 180'', the voltage source 186 supplies electricity to the electrode 188 generating an arc 238 between the electrode 188 and the workpiece 104 (i.e., the ground 182) in the melting zone 226. The arc 238 melts the feed material 220, the supplemental material 222, and/or the workpiece 104 forming a molten material pool 232. The gas nozzle 174 sprays and/or blows shielding gas 224 onto and/or over the melting zone 226 while melting the materials to prevent oxidation.

Figure 4:
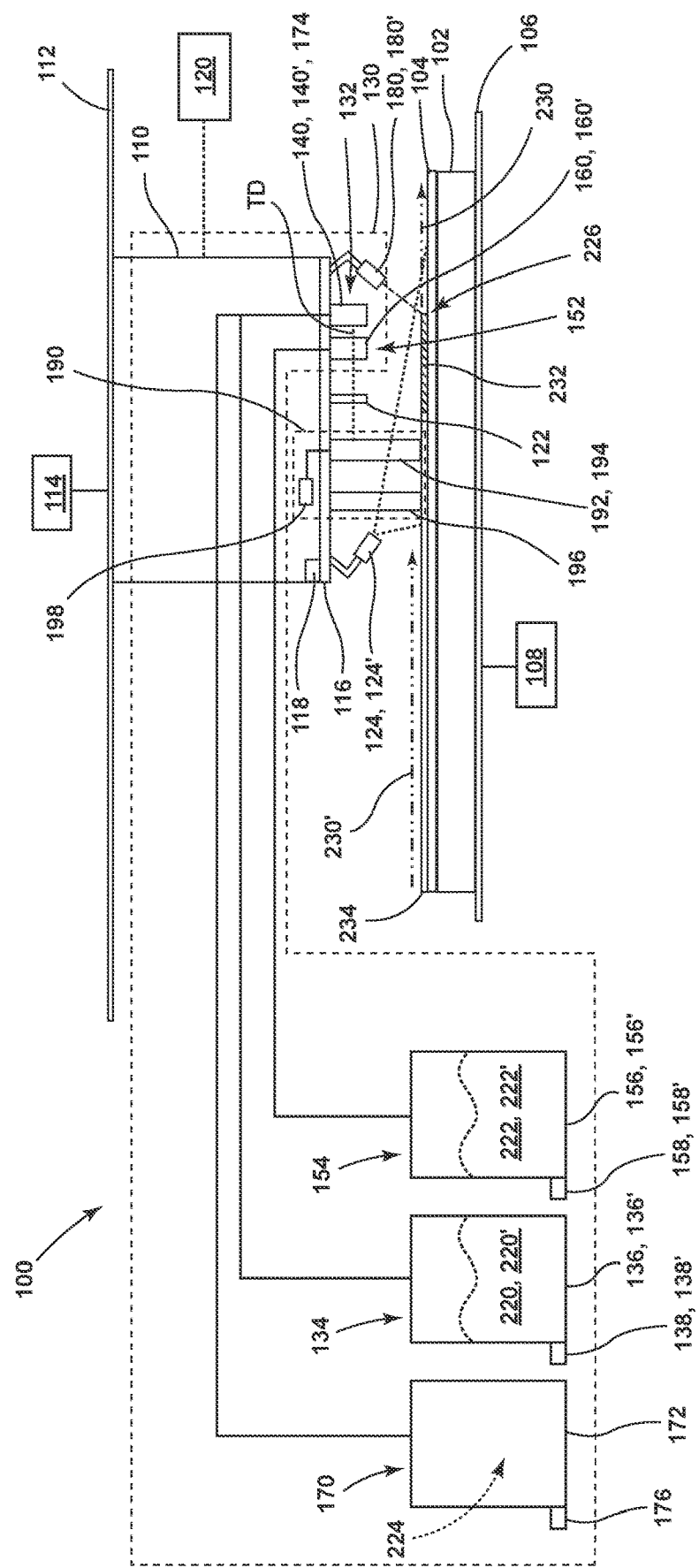
FIG. 4 illustrates an AM system according to the disclosure.

In some examples, such as the system 100 in FIG. 4, the melting mechanism 180 includes a beam emitter 180', such as a laser beam emitter and/or an electron beam emitter. The beam emitter 180' is configured to provide a laser beam (e.g., a focused stream or beam of photons that provides a concentrated heat source) and/or an electron beam (e.g., a focused stream or beam of electrons that bombard the melting zone 226 and generate heat on impact) onto and/or proximate to at least a portion of the feed material 220 disposed in the melting zone 226. The beam melts the feed material 220, the supplemental material 222, and/or the workpiece 104 forming a molten material pool 232. The gas nozzle 174 sprays and/or blows shielding gas 224 onto and/or over the melting zone 226 while melting the materials to prevent oxidation.

The mechanical unit 190 is a device or group of components configured to perform a deformation process (e.g., during a deformation subprocess of the unified ADM process) to modify, alter, adjust, etc. the properties, characteristics, and/or microstructure of the material (e.g., the bead 234) applied by the AM unit 130 during the application subprocess. The mechanical unit 190 is also configured to perform a machining process (e.g., during a machining subprocess of the unified ADM process) to machine the material (e.g., the bead 234 and/or layer 236 (s) of material) applied by the AM unit 130 during the application subprocess. The mechanical unit 190 includes a deformation tool 192, which may be configured as a stirring tool 194 in some examples, and a tool actuator 198. The mechanical unit 190 may also include one or more machining tools 196.

In at least some examples, the mechanical unit 190 is configured to plastically deform the applied material (e.g., at a controllable strain, strain rate and/or temperature based on a targeted thermomechanical history) to modify the properties, characteristics, and/or microstructure of the applied material during the deformation subprocess. Plastically deforming the applied material with the mechanical unit 190 may modify the microstructure of the applied material to provide the material with the desired properties and/or characteristics. Plastically deforming the applied material with the mechanical unit 190 may also enable production of a local change of the chemical composition, a local change of the thermomechanical schedule, and/or a functional-gradient of compositions and/or microstructures of the material. Additionally, plastically deforming the applied material with the mechanical unit 190 may reduce, remove, eliminate, etc. one or more defects (e.g., cracks, microcracks, voids, pores, non-metallic inclusions, etc.) that may occur during the application subprocess and/or may be present in the applied material. Furthermore, when one or more supplemental materials 222 have been combined with the feed material 220 in the application subprocess, the mechanical unit 190 may mix and/or distribute the supplemental materials 222 throughout the material in a more uniform manner, which may provide the material with a more homogonous composition.

The mechanical unit 190 includes a deformation tool 192 configured to plastically deform the applied material. The deformation tool 192 deforms the applied material at a controllable strain, strain rate, and/or temperature (e.g., based on a targeted thermomechanical history). The deformation tool 192 is configured to deform the applied material by performing at least one of friction stirring process, an ultrasonic vibration process, and/or a compression/forging process. The deformation tool 192 may be, for example, configured as a stirring tool 194, a piezoelectric vibrator, ultrasonic horn, etc.

The deformation tool 192 is releasably connected and/or coupled to the toolhead 110 and/or the track assembly 116 so that it can be swapped or replaced based on the situation (e.g., the size of the metal AM product being produced, the composition of the feed material 220, breakage). The deformation tool 192 is disposed behind the feed material applicator 140 relative to a direction in which the feed material 220 is applied during the application subprocess (i.e., the application direction). The distance between deformation tool 192 and the feed material applicator 140 in the application direction is referred to as the trail distance TD. The controller 120 is also configured to determine and/or calculate what the trail distance TD should be to produce the desired characteristics and/or properties based on one or more factors including but not limited to the composition of the material of the bead 234 and/or the layer 236 of applied material, the determined deformation temperature range, the cooling rate of the molten material pool 232, the environmental temperature, the first applicator line speed, and/or the deformation tool line speed. The controller 120 is also configured to automatically and/or dynamically adjust and/or change the trail distance TD during operation to adapt to and/or compensate for changes in one or more variables and/or to provide one or more portions or regions of a bead 234 or applied material layer 236 with different properties and/or characteristics. The trail distance TD can be adjusted and/or modified by the controller 120 via adjusting and/or moving the deformation tool 192 and/or the feed material applicator 140 relative to one another (e.g., with the track assembly 116).

Figure 5:
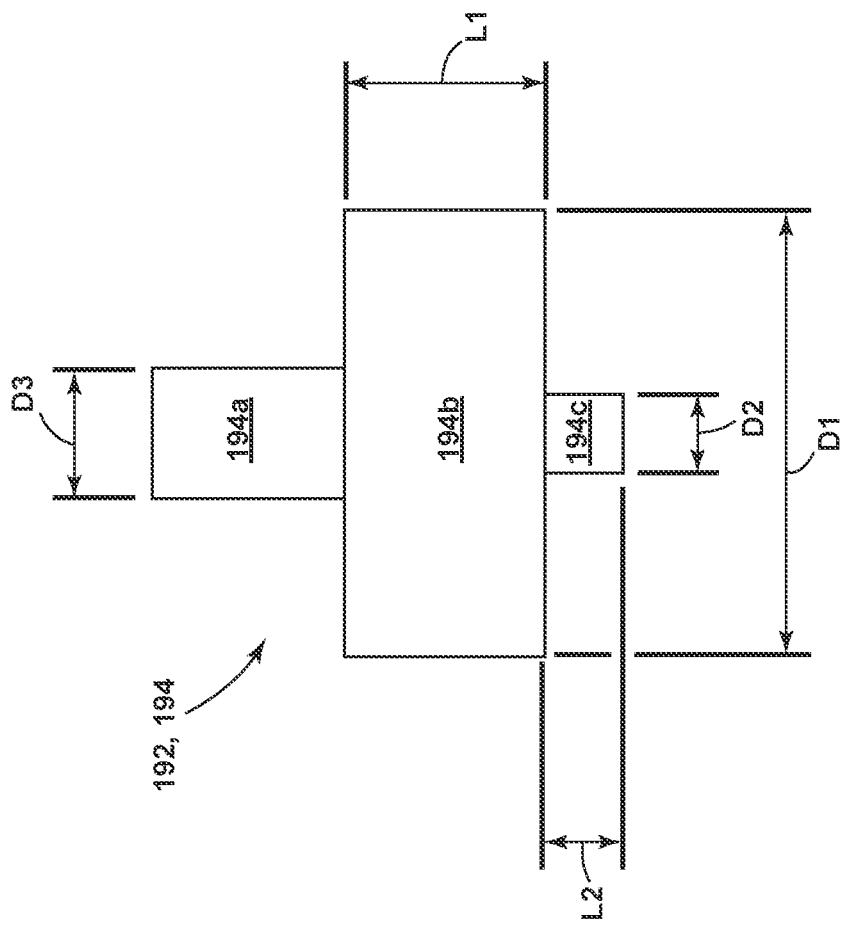
FIG. 5 illustrates a stirring tool according to the disclosure.

In examples, such as the AM systems 100 of FIGS. 1-4, 6, and 9, and those where the mechanical unit 190 performs a friction stirring process, the deformation tool 192 is a stirring tool 194. As illustrated in FIG. 5, the stirring tool 194 includes a base portion 194a, a shoulder portion 194b, and a pin portion 194c. The base portion 194a, the shoulder portion 194b, and the pin portion 194c are generally cylindrical in shape, but may have any other desired shape. The shoulder portion 194b is disposed axially between and separates the base portion 194a and the pin portion 194c. The base portion 194a and the pin portion 194c project from the shoulder portion 194b in opposite axial directions. The shoulder portion 194b has a shoulder diameter D1 (e.g., approximately 25 mm) and a shoulder axial length L1, which is equal to the shoulder diameter D1. Alternatively, the shoulder axial length L1 is different than the shoulder diameter D1. The pin portion 194c has a pin diameter D2 (e.g., approximately 5 mm) and a pin axial length L2 (e.g., approximately 5 mm), which is equal to the pin diameter D2. Alternatively, the pin axial length L2 is different than the pin diameter D2. The base portion 194a has a base diameter D3 (e.g., approximately 18 mm). The base diameter D3 is larger than the pin diameter D2 and smaller than the shoulder diameter D1. The design and dimensions of the stirring tool 194 may be adjusted as desired. For example, the pin axial length L2 may be adjusted to achieve a desired plunge depth. As another example, the shoulder diameter D1 may be adjusted based on the dimensions of the bead 234 produced during the application subprocess.

The material composition of the stirring tool 194 is an important factor to consider since excessive heat is involved during operation. In the illustrative examples herein, the stirring tool 194 is composed of H13 tool steel due to its hot hardness/strength, toughness, stability, and resistance to thermal fatigue cracking. Alternatively, the stirring tool 194 may be composed of other appropriate materials.

The mechanical unit 190 is also configured to machine the applied material (e.g., a bead 234 and/or one or more layers 236) during the machining subprocess. For example, the mechanical unit 190 is configured to machine at least a top surface and/or one or more side surfaces of the applied material (e.g., via grinding) to remove material, provide a desired shape/geometry, and/or provide a surface finish. Optionally, the mechanical unit 190 can utilize the stirring tool 194 to machine the applied material. In the illustrative examples of FIGS. 1-4 and 6, the mechanical unit 190 includes a separate machining tool 196 for this purpose. In at least some examples, the machining tool 196 may be structured identically to the stirring tool 194 (e.g., the mechanical unit 190 may include two stirring tools 194-a first stirring tool 194 used for deformation during the deformation subprocess and a second stirring tool 194 used for machining during the machining subprocess). The mechanical unit 190 may also conceivably include multiple machining tools 196 to enable several surfaces of the applied material to be machined simultaneously.

The mechanical unit 190 and/or the toolhead 110 includes one or more tool actuators 198 operatively connected to the deformation tool 192 and/or the machining tool 196. The one or more tool actuators 198 are configured to move the deformation tool 192 and/or the machining tool 196 (e.g., linearly, rotationally, angularly, etc.). In the illustrative examples of FIGS. 1-4, the tool actuator 198 is configured to move the stirring tool 194 and/or the machining tool 196 in a vertical direction (e.g., to plunge the stirring tool 194 into the bead 234 and to remove the plunged stirring tool 194 from the bead 234). The tool actuator 198 is also configured to rotate, spin, and/or twist the stirring tool 194 and/or the machining tool 196 to stir, mix, deform, remove, machine, surface/resurface, etc. the applied material. The tool actuator 198 is also configured to adjust an angle of the stirring tool 194 and/or the machining tool 196 (e.g., to tilt) relative to a vertical direction (e.g., a direction of gravity). In some examples, the mechanical unit 190 includes a separate tool actuator 198 for the deformation tool 192 and the machining tool 196 and/or a separate tool actuator 198 for each of the aforementioned functions.

The cooling mechanism 122 is configured to facilitate cooling of the molten material pool 232 and/or the bead 234 applied during the application subprocess. The cooling mechanism 122 may be an air mover, fan, blower, or similar mechanism configured to provide a stream of air 228 onto the molten material pool 232 (e.g., adjacent to and/or behind the melting zone 226) and/or the bead 234 to forcibly cool the molten material pool 232 and/or the bead 234. For example, the cooling mechanism 122 may forcibly cool the molten material pool 232 and/or the bead 234 to reduce the temperature of the molten material pool 232 and/or the bead 234 to be within and/or close to the determined deformation temperature range.

The temperature detection mechanism 124 is configured to detect a temperature of the molten material pool 232 (e.g., at, adjacent to, and/or behind the melting zone 226) and/or the bead 234. In the illustrative examples of FIGS. 1-4 and 6, the temperature detection mechanism 124 is an inferred camera 124'. Alternatively, the temperature detection mechanism 124 may be a temperature sensor or similar mechanism.

An exemplary method of additively manufacturing a metal AM product via a unified ADM process is described below. The unified ADM process is capable of producing metal AM products with properties and/or characteristics (e.g., microstructure, crystallographic phase(s), grain structure, grain size, chemical composition, strength, hardness, ductility, surface finish/roughness) that could not be obtained using previous manufacturing systems and properties. In short, the method includes the coordinated performance of (i) an application subprocess via which material is applied to a workpiece and melted to form a molten pool of applied material, (ii) a deformation subprocess via which the applied material is deformed to provide the material with the desired properties and/or characteristics, and (iii) a machining subprocess via which the deformed material is machined. The method may include one or more steps, which may be performed with the disclosed AM system 100 according to the following description.

The method includes receiving, via the controller 120, one or more user inputs related to the AM system 100 and/or a metal AM product to be produced thereby. The controller 120 then determines (e.g., optimal) parameters to produce the metal AM product based on the user inputs. For example, the controller 120 determines a deformation temperature range and a trail distance TD. When the metal AM product that is to be produced has one or more regions with different desired characteristics and/or properties, the controller 120 may determine a respective set of parameters for producing each region (e.g., a first set of parameters for producing a first region with a first set of desired characteristics and/or properties and a second set of parameters for producing a second region with a second set of desired characteristics and/or properties). Optionally, the controller 120 may recommend the determined parameters to the user for review and confirmation. As described in further detail below, the controller 120 then controls/operates the AM system 100 (and/or other components thereof) and coordinates performance of the application subprocess, the deformation subprocess, and the machining subprocess performed by the AM system 100 according to the determined parameters to perform a unified ADM process that produces the metal AM product having the desired characteristics and properties. The controller 120 may operate the AM system 100 to perform the steps and/or subprocesses described below.

First, the controller 120 may position the toolhead 110 above the stage 102 and/or the workpiece 104. One or more components of the AM system 100 (e.g., the cooling mechanism 122, the temperature detection mechanism 124, the feed material applicator 140, the supplemental material applicator 160, the gas nozzle 174, the melting mechanism 180, the deformation tool 192, and/or the machining tool 196) are adjusted and/or moved to a respective position based on the determined parameters. The controller 120 may actuate one or more actuators 108, 114, 118, 198 to move one or more components 122, 124, 140, 160, 174, 180, 192, 196 along the track assembly 116 to their respective position. For example, the controller 120 actuates the actuator 118 to move the deformation tool 192 and the feed material applicator 140 along the track assembly 116 to their respective positions in which the deformation tool 192 is arranged behind the feed material applicator 140 at the determined trail distance TD relative to the application direction.

Figure 6:
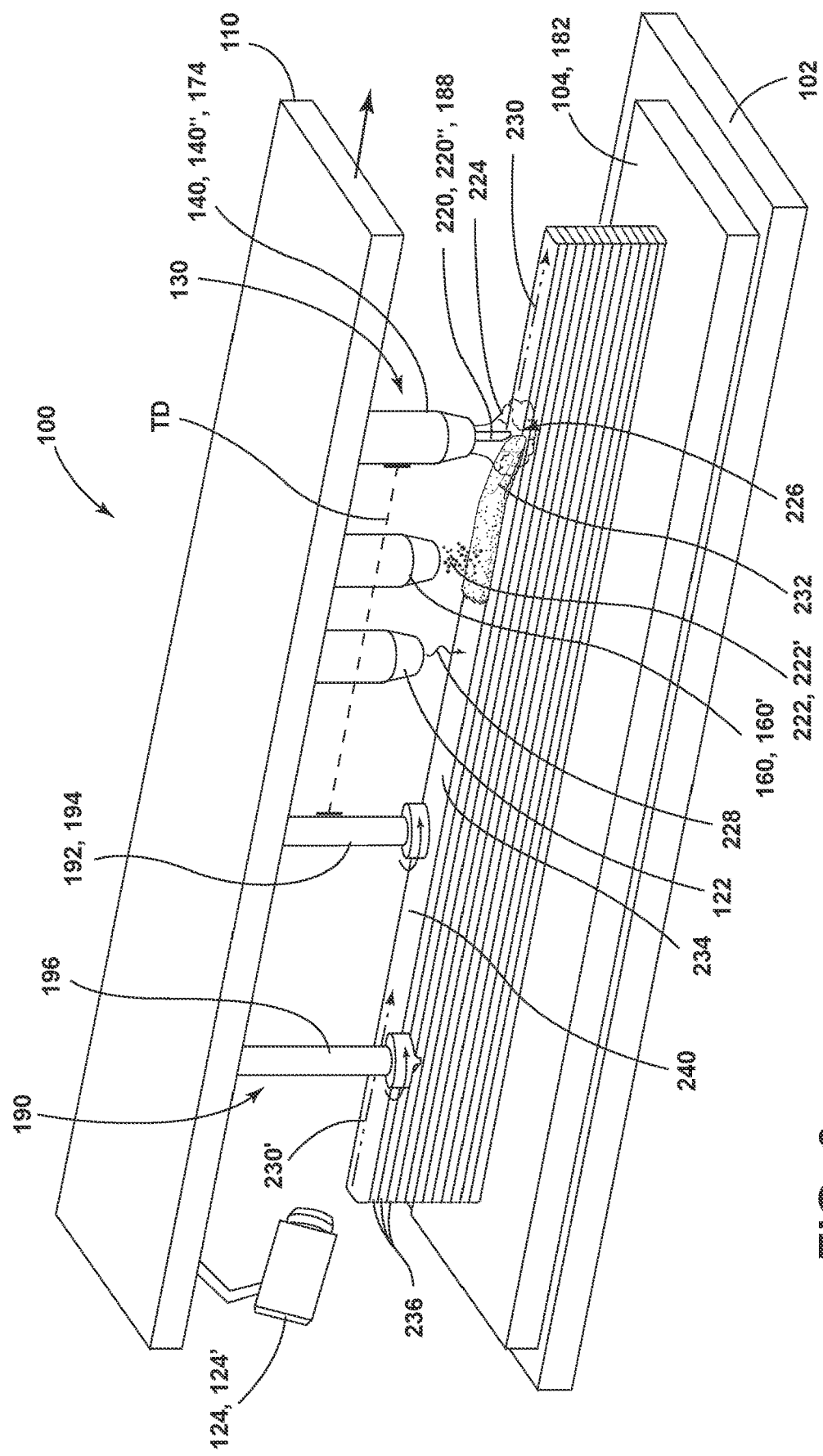
FIG. 6 illustrates an AM system performing a unified ADM process according to the disclosure.

As generally illustrated in FIG. 6, the controller 120 then actuates the actuator 114 to move the toolhead 110 relative to the stage 102 such that the cooling mechanism 122, the temperature detection mechanism 124, the AM unit 130, the mechanical unit 190, and/or one or more portions thereof (e.g., the applicators 140, 160, the gas nozzle 174, the melting mechanism 180, the deformation tool 192, the machining tool 196) move along a planned path 230. While moving along at least a portion of the planned path 230, the AM unit 130 performs an application subprocess and the mechanical unit 190 performs a deformation subprocess and/or a machining subprocess to form a layer and/or plane of applied material 236 (also referred to as an applied material layer 236 herein). In the illustrative example of FIG. 6, the feed material applicator 140, the supplemental material applicator 160, the cooling mechanism 122, the deformation tool 192, and the machining tool 196 follow one another along the planned path 230 in this order when the toolhead 110 is moved relative to the stage 102. The deformation tool 192 follows the feed material applicator 140 along the planned path 230 at the determined trail distance TD such that the deformation tool 192 deforms material of the bead 234 when it is within the determined deformation temperature range.

Alternatively, to form an applied material layer 236, the controller 120 may move the stage 102 relative to the toolhead 110 to adjust and/or move the cooling mechanism 122, the AM unit 130, the mechanical unit 190, and/or one or more portions thereof (e.g., the applicators 140, 160, the gas nozzle 174, the melting mechanism 180, the deformation tool 192, the machining tool 196) along the planned path 230. The controller 120 could also conceivably form an applied material layer 236 by individually moving the cooling mechanism 122, the temperature detection mechanism 124, the AM unit 130, the mechanical unit 190, and/or one or more portions thereof (e.g., the applicators 140, 160, the gas nozzle 174, the melting mechanism 180, the deformation tool 192, the machining tool 196) relative to the toolhead 110 and relative to the stage 102 to adjust the components along the planned path 230.

While moving the toolhead 110, the AM unit 130 performs an application subprocess to create a bead 234 of material, the mechanical unit 190 performs a deformation subprocess to deform the material of the bead 234 as the bead 234 is being created, and optionally the mechanical unit 190 performs a machining subprocess to machine the bead 234. In other words, the application subprocess, the deformation subprocess, and optionally the machining subprocess are performed during the same single movement of the toolhead 110 and their performance is coordinated by the controller 120. From the perspective of a single location on the planned path 230, the application subprocess occurs at the location first, followed by deformation subprocess, and optionally the machining subprocess occurs next within a short period of time (e.g., the subprocesses occur at the location in relatively quick succession). Nevertheless, in at least some situations, during at least a portion of the unified ADM process, the application subprocess, the deformation subprocess, and optionally the machining subprocess are performed simultaneously (albeit at different locations) as the toolhead 110 travels along the planned path 230. The application subprocess, the deformation subprocess, and the machining subprocess are described in further detail below.

Performing the application subprocess, the deformation subprocess, and the machining subprocess during a single movement of the toolhead 110 facilitates maintaining the positions and orientations of the various components traveling along the planned path 230. It also reduces production time and production costs. For example, if the bead 234 were produced during a first pass of the toolhead 110 along the planned path 230 and the bead 234 were deformed during a second pass of the toolhead 110 along the planned path 230, the bead 234 would likely need to be locally heated to raise the temperature to within the determined deformation temperature range before it could be deformed during the deformation subprocess. During the unified ADM process, however, the bead 234 is deformed while it is still hot from the application subprocess eliminating the need to locally reheat the bead 234 before and/or during the deformation subprocess, which reduces production time and cost.

Once the toolhead 110 reaches the end of the planned path 230, the bead(s) 234 created thereby collectively define the layer 236 of applied material (e.g., a first applied material layer 236). The controller 120 then operates the AM system 100 to repeat the previously described steps to form another layer 236 of applied material on the previously produced layer 236 of applied material (e.g., a second applied material layer 236 on the first applied material layer 236). This includes, for example, the controller 120 positioning the toolhead 110 above the previously produced layer 236 of applied material, (optionally) adjusting and/or moving one or more components of the AM system 100 to a different respective position, and then adjusting and/or moving the toolhead 110 along another planned path 230', which may be the same as or different from the planned path 230 traveled when producing the previous layer 236 of applied material, while the AM unit 130 performs the application subprocess, the mechanical unit 190 performs the deformation subprocess, and/or the mechanical unit 190 performs the machining subprocess. This is repeated several times over (e.g., producing a third applied material layer 236 on the second applied material layer 236, a fourth applied material layer 236 on the third applied material layer 236, etc.) to produce a stack of applied material layers 236 that collectively form a three-dimensional metal AM product having the desired properties and characteristics.

The application subprocess performed by the AM unit 130 generally includes positioning and/or placing feed material 220 at a desired location on and/or adjacent to the workpiece 104 and/or a previously applied layer 236 of material (e.g., in the melting zone 226) via the feed material applicator 140. The feed material 220 is then melted in the melting zone 226 via the melting mechanism 180 to produce a molten material pool 232. Shielding gas 224 is sprayed and/or blown onto and/or over the melting zone 226 via the gas nozzle 174 at least while melting the feed material 220 to prevent oxidation. Optionally, one or more supplemental materials 222 is deposited, applied, and/or disposed onto the melting zone 226 as the feed material 220 is melted and/or onto the molten material pool 232 via the supplemental material applicator 160. As the feed material 220 is positioned/applied and melted while the toolhead 110 is moving along the planned path 230 (which moves the applicators 140, 160, the gas nozzle 174, and/or the melting mechanism 180 along the planned path 230), the molten material pool 232 is formed along at least a portion of the planned path 230. The molten material pool 232 then cools to a solidified solid phase forming a bead 234 of material containing the feed material 220 and, optionally, one or more supplemental materials 222 along the portion of the planned path 230. The material feeder 134 intermittently and/or continuously supplies feed material 220 from the retainer 136 to the feed material applicator 140 while the toolhead 110 is moved along the planned path 230 and the molten material pool 232 (and subsequently the bead 234) is being formed. Optionally, the supplemental material feeder 154 intermittently and/or continuously supplies and/or feeds supplemental material 222 from the supplemental retainer 156 to the supplemental material applicator 160 while the toolhead 110 is moved along the planned path 230, the molten material pool 232 (and subsequently the bead 234) is being formed, and the supplemental material 222 is being deposited. The steps/process involved in positioning/applying and melting the feed material 220 may vary based on the configuration of the AM unit 130.

Figure 7:
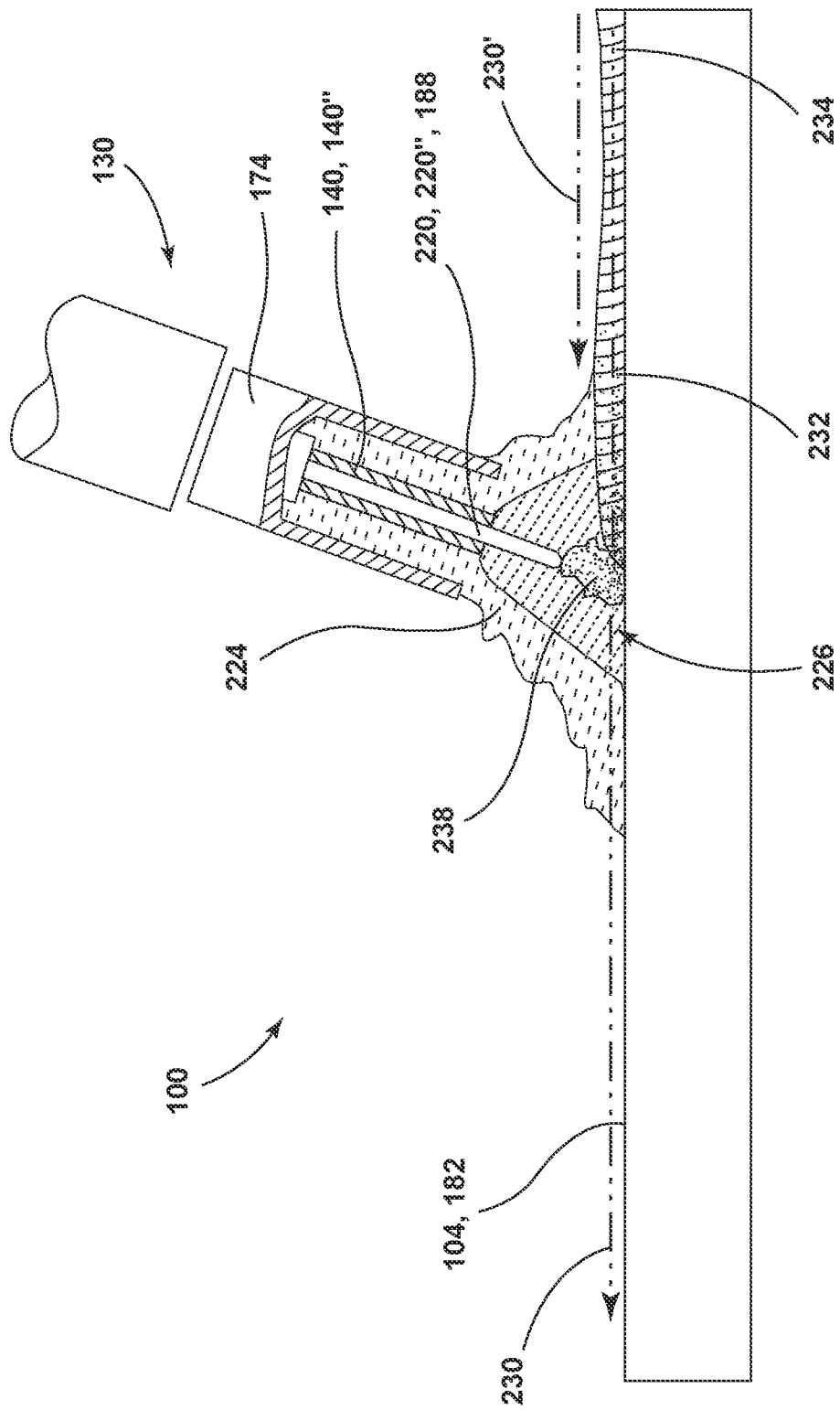
FIG. 7 illustrates a portion of an AM unit configured as a metal inert gas unit performing at least a portion of an application subprocess according to the disclosure.

In some examples, such as those in which the AM unit 130 is configured as a MIG unit and the melting mechanism 180 is an electrical arc unit 180'' like in the system 100 of FIGS. 2 and 6, positioning/applying and melting the feed material 220 includes the following steps. As depicted in FIG. 7, the feed material applicator 140 (e.g., the probe holder 140'') positions a free end of the feed material wire 220'' at a desired location on or above a surface of the workpiece 104 and/or the previous layer 236 of applied material onto which the molten material pool 232 is to be formed (e.g., the melting zone 226). An electrical current is supplied to the feed material wire 220'', which functions as the electrode 188 and a consumable arc probe, via the voltage source 186. This generates an arc 238 in the melting zone 226 between the free end of the feed material wire 220'' and the workpiece 104 and/or the previous layer 236 of applied material (e.g., the ground 182), which melts the free end of the feed material wire 220'' forming the molten material pool 232 on the workpiece 104 and/or the previous layer 236 of applied material.

Figure 8:
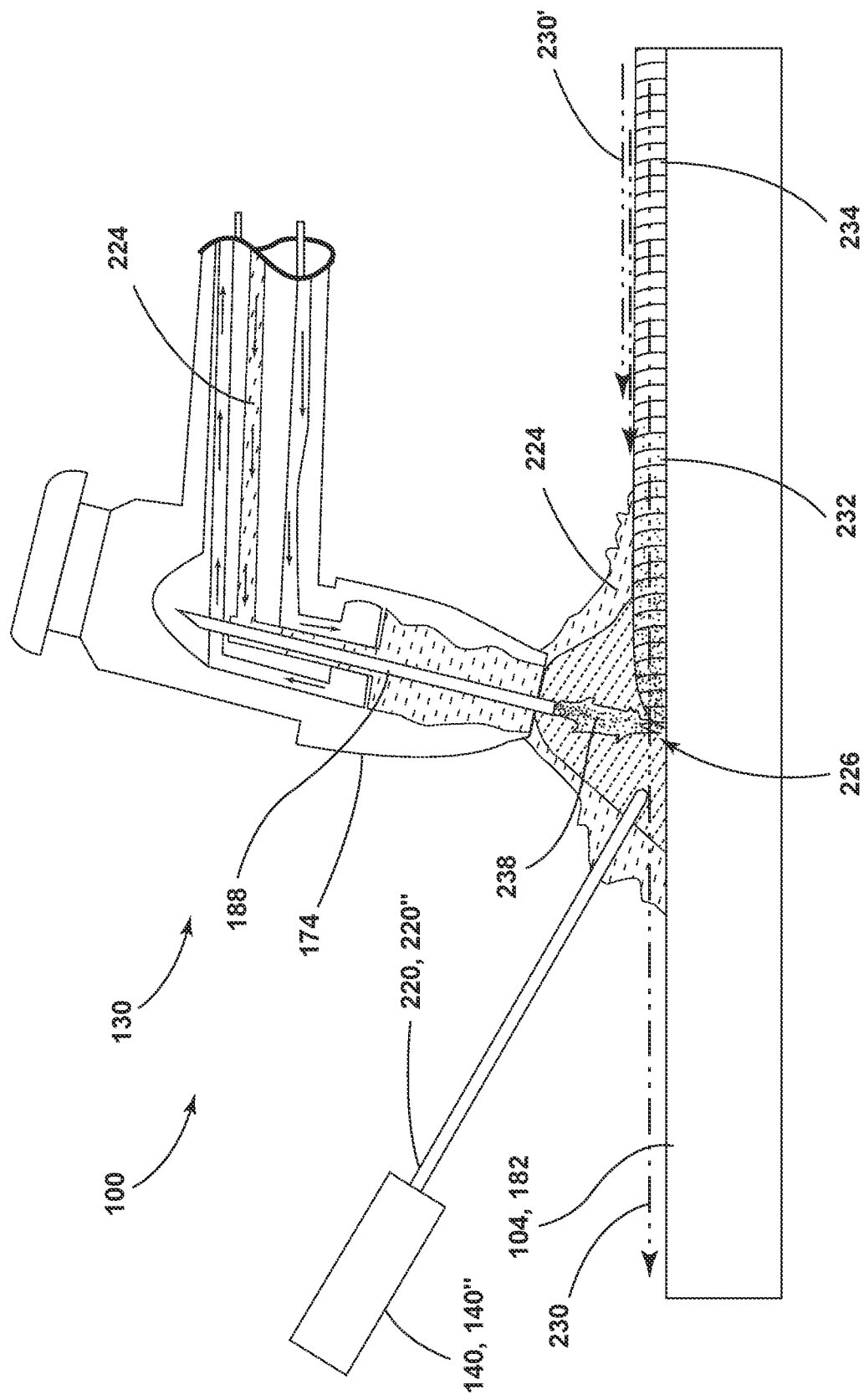
FIG. 8 illustrates a portion of an AM unit configured as a tungsten inert gas unit performing at least a portion of an application subprocess according to the disclosure.

In other examples, such as those in which the AM unit 130 is configured as a TIG unit and the melting mechanism 180 is an electrical arc unit 180'' like in the system 100 of FIG. 3, positioning/applying and melting the feed material includes the following steps. As depicted in FIG. 8, the feed material applicator 140 (e.g., the probe holder 140'') positions a free end of the feed material wire 220'', which functions as a consumable arc probe, at a desired location on or above a surface of the workpiece 104 and/or the previous layer 236 of applied material onto which the molten material pool 232 is to be formed (e.g., the melting zone 226). The gas nozzle 174 and/or another probe holder thereof positions a free end of the electrode 188, which functions as a non-consumable arc probe, near and/or adjacent to the free end of the feed material wire 220''. An electrical current is supplied to the electrode 188 via the voltage source 186. This generates an arc 238 in the melting zone 226 between the free end of the electrode 188 and the workpiece 104 and/or the previous layer 236 of applied material (e.g., the ground 182), which melts the free end of the feed material wire 220'' forming the molten material pool 232 on the workpiece 104 and/or the previous layer 236 of applied material.

In still other examples, such as those in which the melting mechanism 180 is a beam emitter 180' like in the system 100 of FIG. 4, disposing/applying and melting the feed material 220 includes the following steps. The feed material applicator 140 (e.g., the feed nozzle 140') sprays, deposits, and/or applies feed material powder 220' onto a surface of the workpiece 104 and/or the previous layer 236 of applied material onto which the molten material pool 232 is to be formed (e.g., the melting zone 226). A beam (e.g., a laser beam or an electron beam) is applied, via the beam emitter 180', to the feed material powder 220' deposited in the melting zone 226. The beam melts the feed material powder 220' in the melting zone 226 forming the molten material pool 232 on the workpiece 104 and/or the previous layer 236 of applied material.

The temperature detection mechanism 124, 124' detects the temperature of the melting zone 226, the temperature of the molten material pool 232, and/or one or more portions of the bead 234 (e.g., a portion of the bead 234 disposed between the feed material applicator 140 and the deformation tool 192, a portion of the bead 234 being deformed by the deformation tool 192, a portion of the bead 234 that is about to be or is being machined via the machining tool 196) and conveys the detected temperature information to the controller 120. The controller 120 actively monitors the detected temperature information throughout the unified ADM process and, as necessary, automatically and dynamically adjusts and/or modifies one or more of the determined parameters (e.g., the trail distance TD, the amount of forcible cooling provided by the cooling mechanism 122) based on the detected temperature information. Dynamically modifying the determined parameters may include dynamically modifying one or more of the trail distance TD, the level of forcible cooling provided by the cooling mechanism 122, the AM unit line speed, and the deformation tool line speed such that each portion of the bead 234 is within the determined deformation temperature range when that portion is deformed via the deformation tool 192. In this way, the controller 120 actively adapts and coordinates the application subprocess, the deformation subprocess, and the machining subprocess thereby ensuring that the metal AM product that is produced has the desired properties and/or characteristics.

Optionally, one or more portions or regions of the molten material pool 232 and/or the bead 234 may be forcibly cooled by the cooling mechanism 122 prior to that portion or region being deformed by the mechanical unit 190. To forcibly cool the molten material pool 232 and/or the bead 234, the cooling mechanism 122 supplies a stream of air 228 onto and/or near the molten material pool 232 and/or the bead 234 to reduce the temperature of the molten material pool 232 and/or the bead 234 (e.g., to a temperature within or around the determined deformation temperature range). Reducing the temperature of the molten material pool 232 and/or the bead 234 in this manner may, for example, ensure the temperature of the bead 234 is within the determined deformation temperature range when the bead 234 is plastically deformed by the deformation tool 192. It may also enable the controller 120 to quickly adapt to changing circumstances (e.g., an increase in the environmental temperature causing a reduced cooling rate of the molten material pool 232) and reduce the temperature of the molten material pool 232 and/or bead 234 accordingly without having to modify one or more other parameters, which may be considered more influential and/or critical to the unified ADM process.

The deformation subprocess performed by the mechanical unit 190 includes deforming the material of the bead 234 via the deformation tool 192 when the bead 234 is within the determined deformation temperature range to modify the characteristics, properties, and/or microstructure of the material of the bead 234 (e.g., to provide the material of the bead 234 with the desired properties and/or characteristics) and/or to reduce and/or eliminate one or more defects in the bead 234. Since the deformation tool 192 follows the feed material applicator 140 along the planned path 230 at the determined trail distance TD, the bead 234 is actively deformed by the deformation tool 192 as the AM unit 130 is producing it.

Figure 9:
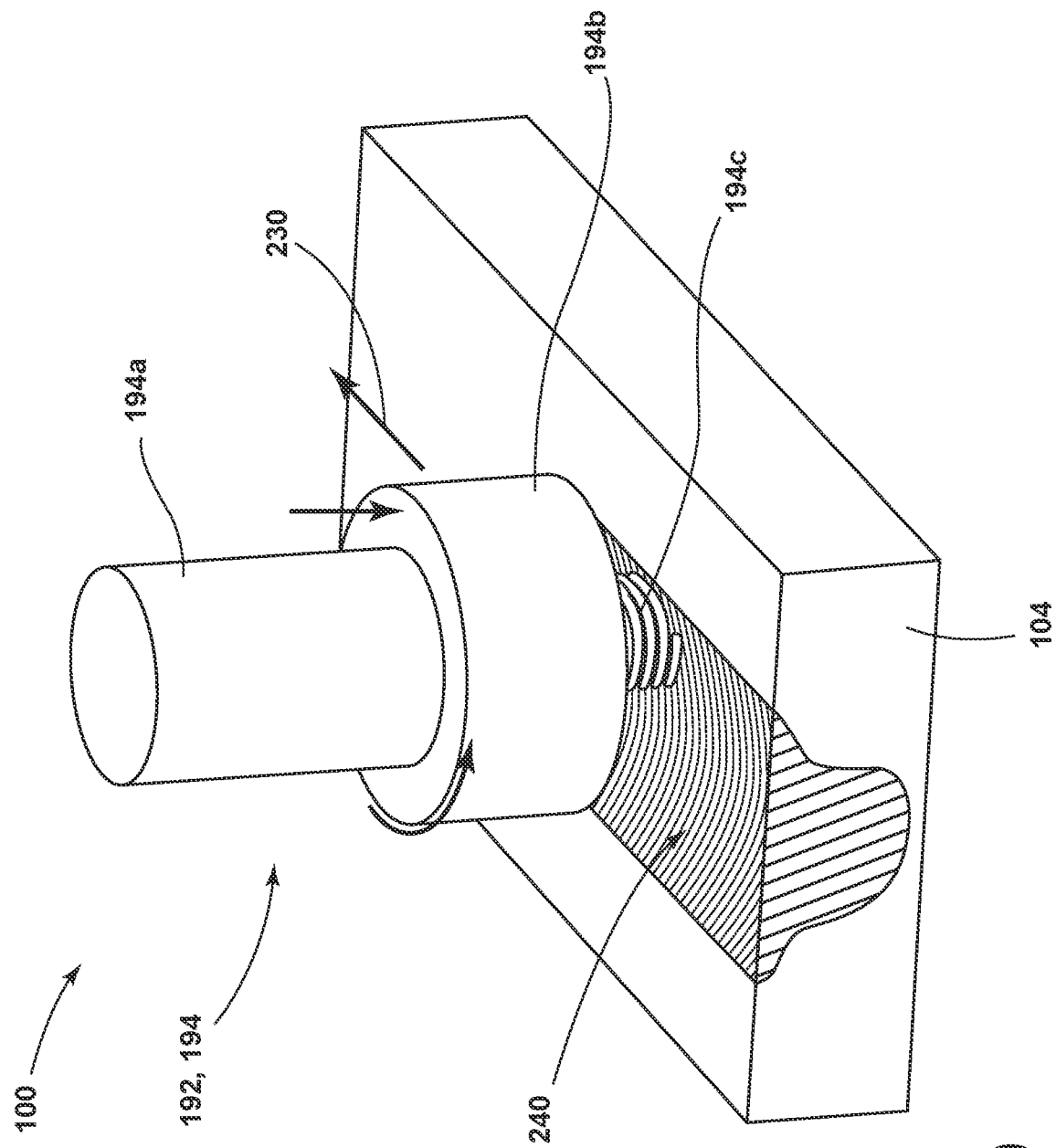
FIG. 9 illustrates a portion of a stirring tool performing at least a portion of a deformation subprocess according to the disclosure.

In some examples, such as when the deformation tool 192 is a stirring tool 194 like in FIGS. 1-4 and 6, deforming the material of the bead 234 includes the following steps. The stirring tool 194 is rotated/spun about its central longitudinal axis via actuating the tool actuator 198. The pin portion 194c of the stirring tool 194 is then plunged into the bead 234 (e.g., vertically and/or horizontally) while the stirring tool 194 is rotating/spinning to deform the material of the bead 234. For example, the stirring tool 194 may be adjusted vertically via actuating the tool actuator 198 to plunge the pin portion 194c vertically into the bead 234. Alternatively, the tool actuator 198 adjusts and/or moves the stirring tool 194 vertically to dispose the stirring tool 194 at a determined vertical position and the pin portion 194c is plunged horizontally into the bead 234 via the movement of the toolhead 110 along the planned path 230 (e.g., the starting end of the bead 234 is formed directly in front of the stirring tool 194 along the planned path 230 due to the stirring tool 194 being disposed at the determined trail distance TD and, thus, the pin portion 194c of the stirring tool 194 will be natural plunged horizontally into the starting end of the bead 234 as the toolhead 110 travels along the planned path 230). As generally illustrated in FIGS. 6 and 9, the pin portion 194c is disposed in the bead 234 and the stirring tool 194 is rotating/spinning while the toolhead 110 is moving along the planned path 230 causing the stirring tool 194 to deform the material of the bead 234 along at least a portion of the planned path 230 and produce deformed material 240 having the desired characteristics and properties.

When the pin portion 194c is disposed in the bead 234 and the stirring tool 194 is rotating/spinning, the vertical force applied to the bead 234 by the shoulder portion 194b of the stirring tool 194 and the rotation of the shoulder portion 194b relative to the bead 234 heats (i.e., increases the temperature) the material of the bead 234 around the shoulder portion 194b. The shoulder portion 194b of the stirring tool 194 also flattens an upper surface of the bead 234, which facilitates production of the next layer 236 of applied material on the layer 236 of material currently being produced and enhances the quality of the next layer 236 of applied material. Additionally, the pin portion 194c of the stirring tool 194 generates rotational force and torque, which causes a plastic flow (e.g., plastic deformation) of the material of the bead 234. The plastic flow of the material of the bead 234 also distributes and/or mixes the supplemental material(s) 222 throughout the material in more uniform manner, which provides the material of the bead 234 with a more homogonous composition. The combined effect of the material flow, plastic deformation, and the frictional heating determines and/or influences the resulting microstructure of the material of the bead 234 and reduces and/or eliminates one or more defects in the bead 234. In this way, the stirring tool 194 deforms the material of the bead 234 to modify the properties, characteristics, and/or microstructure of the material of the bead 234 (e.g., to provide the bead 234 with the desired characteristics and properties) and reduce and/or eliminate one or more defects in the bead 234.

In some examples, the machining subprocess performed by the mechanical unit 190 includes machining one or more surfaces of the bead 234 (e.g., an upper surface, one or more side surfaces) to remove material of the bead 234 and/or to provide the bead 234 and/or a surface thereof with a desired shape/geometry, dimensional precision, and/or surface finish. In the illustrative examples of FIGS. 1-4 and 6, the one or more surfaces of the bead 234 are machined by a machining tool 196 of the mechanical unit 190 which follows behind the deformation tool 192 along the planned path 230 when moving the toolhead 110 relative to the stage 102. In this way, the bead 234 is produced, deformed, and machined in a short period of time (e.g., in relatively quick succession). Machining one or more surfaces of the bead 234 with the machining tool 196 may include pressing the machining tool 196 against one or more surfaces of the bead 234 while rotating/spinning the machining tool 196 and moving the rotating/spinning machining tool 196 along the one or more surfaces (e.g., with the movement of toolhead 110 relative to the stage 102) to, for example, grind the one or more surfaces of the bead 234.

Additionally and/or alternatively, the machining subprocess includes machining one or more surfaces of an applied material layer 236 (e.g., an upper surface, one or more side surfaces) to remove material of the applied material layer 236 and/or to provide the applied material layer 236 and/or a surface thereof with a desired shape/geometry, dimensional precision, and/or surface finish. An applied material layer 236 may be machined (e.g., individually) after its completion and before the next applied material layer 236 is formed on top of it. Additionally and/or alternatively, several applied material layers 236 may be machined together at the same time (see, e.g., FIG. 6), such as when several applied material layers 236 will be collectively defining a surface of the metal AM product that is intended to be cohesive, uniform, and/or smooth.

One or more surfaces of an applied material layer 236 may be machined with the deformation tool 192, such as the stirring tool 194. For example, after producing one or more applied material layers 236, the stirring tool 194 may be pressed against one or more surfaces of one or more applied material layers 236 while rotating/spinning the stirring tool 194 and moving the rotating/spinning stirring tool 194 along the one or more surfaces (e.g., via moving the stirring tool 194 on the track assembly 116 and/or moving the toolhead 110 along a machining path) to grind the one or more surfaces. As an alternative, one or more applied material layers 236 may be machined with one or more machining tools 196. In some examples, one or more applied material layers 236 may be machined with several tools (e.g., with the stirring tool 194 and one or more machining tools 196) simultaneously. By machining the beads 234 and/or the applied material layers 236 while manufacturing a metal AM product, surfaces and/or areas of the metal AM product that are not accessible upon its completion (e.g., inner surfaces of a cavity) can be provided with a desired shape/geometry, dimensional precision, and/or surface finish by the disclosed AM system 100.

In some examples, the controller 120 automatically modifies and/or changes one or more of the determined parameters while producing a metal AM product to, for example, provide the metal AM product with a non-uniform (e.g., gradient) microstructure. Modifying and/or changing one or more of the determined parameters while producing a metal AM product may include dynamically modifying and/or changing one or more of the determined parameters while producing a bead 234 and/or an applied material layer 236 to provide portions or regions of the bead 234 and/or layer 236 with different characteristics and/or properties (e.g., to provide a first region of the bead 234 and/or layer 236 with a first set of desired characteristics and properties and to provide a second region of the bead 234 and/or layer 236 with a second set of different desired characteristics and properties). Dynamically modifying and/or changing one or more determined parameters may include producing the first region of the bead 234 and/or layer 236 according to a first set of determined parameters and producing the second region of the bead 234 and/or layer 236 according to a second set of determined parameters.

Additionally and/or alternatively, the controller 120 may modify and/or change one or more of the determined parameters between applied material layers 236 to produce applied material layers 236 with different characteristics and properties. Modifying and/or changing one or more determined parameters between layers 236 may include producing a first applied material layer 236 according to a first set of determined parameters and producing a second applied material layer 236 according to a second set of determined parameters. A microstructure gradient that extends across several applied material layers 236, for example, can be produced with the AM system 100 in this manner.

Figure 10:
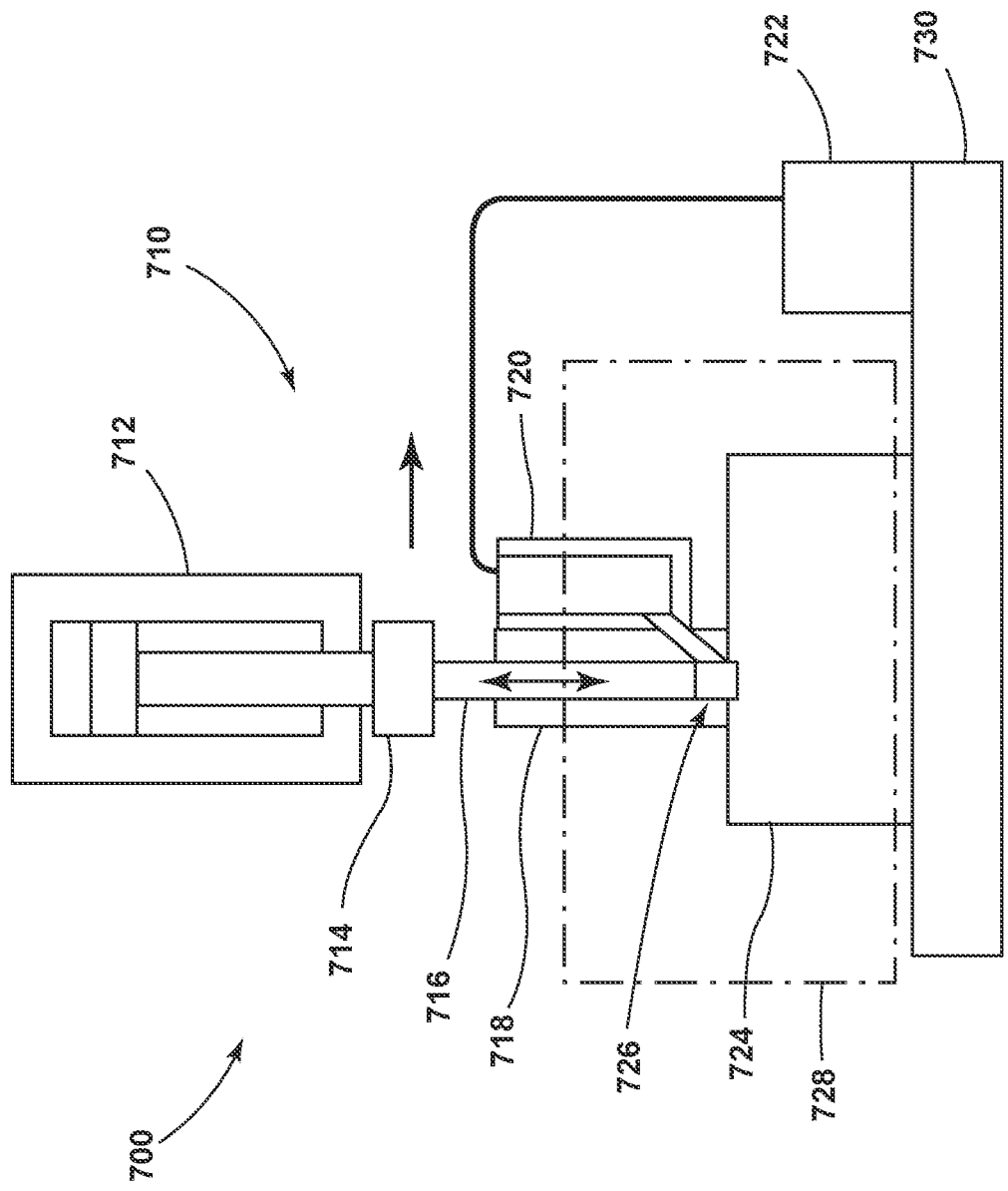
FIG. 10 illustrates an ADM system for ceramic and metal powder consolidation.

FIG. 10 depicts an ADM system 700 for ceramic and metal powder consolidation. The toolhead 710 includes a hydraulic pump 712, a load cell 714 controlled by a controller (not shown), a push rod 716, a rod host 718, and a powder buffer 720. A powder tank 722 is connected to the powder buffer 720. The push rod 716 moves up/down to compress falling powders to bond the base ceramic workpiece 724. The filling powders are automatically filled into the compressing area 726 by gravity. The push rod 716, rod host 718, and the powder buffer 720 are all made of high temperature materials (e.g. silicon carbide), and these tools, along with the top portion of the workpiece 724, are disposed inside a heating chamber 728. The specimen stage 730 is sitting on a 3D motorized stage with computer numerical control.

Figure 11:
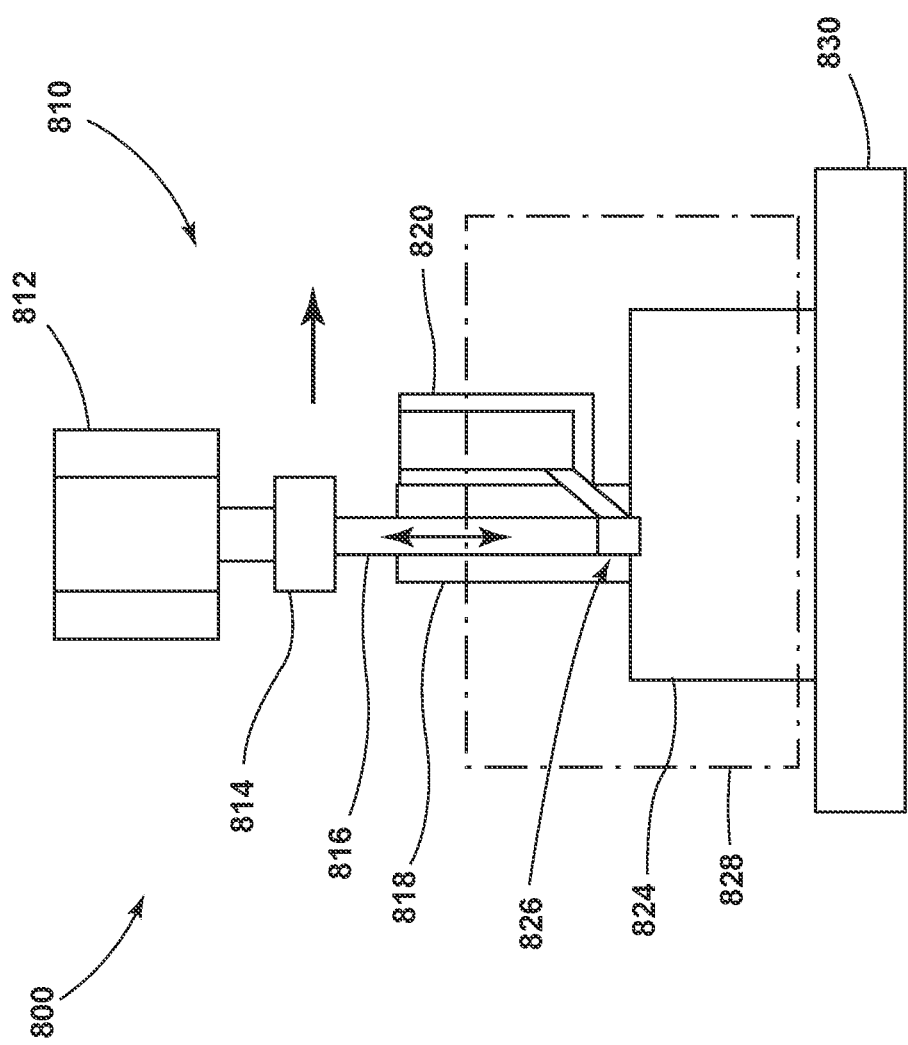
FIG. 11 illustrates another ADM system for ceramic and metal powder consolidation.

For ceramic powder consolidation a high temperature bed/environment is provided, with the local processing zone to be above 0.8 melting point of the ceramic is provided, and the mechanical unit provides stress assistance for fast sintering (similar to hot pressing) to join powder feed to the consolidated ceramics base FIG. 11 depicts an ADM system 800 for ceramics and metal powder consolidation. The toolhead 810 includes an electromagnetic motor (voice coil motor) 812, a load cell 814 controlled by a controller (not shown), a push rod 816, a rod host 818, and a powder buffer 820. The push rod 816 moves up/down to compress falling powders to bond the base ceramic workpiece 824. The filling powders are automatically filled into the compressing area 826 by gravity. The push rod 816, rod host 818, and the powder buffer 820 are all made of high temperature materials (e.g. silicon carbide), and these tools, along with the top portion of the processed workpiece 824, are placed inside a heating chamber 828. The specimen stage 830 is sitting on a 3D motorized stage with computer numerical control.

Various examples/embodiments are described herein for various articles and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Accordingly, even though the present disclosure has been described in detail with reference to specific examples, it will be appreciated that the various modifications and changes can be made to these examples without departing from the scope of the present disclosure as set forth in the claims. It is anticipated and intended that future developments will occur in the technologies discussed herein, and that the disclosed article, device and/or method will be incorporated into such future developments. Thus, the specification and the drawings are to be regarded as an illustrative thought instead of merely restrictive thought.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples." "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It should be understood that references to a single element are not necessarily so limited and may include one or more of such element. Further, all numbers expressing dimensions, ratios and the like, used in the specification and claims, are to be understood to encompass tolerances and other deviations as represented by the term "about" or "approximately." Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments. For example, although the drawings show the crochet hook oriented vertically with respect to the drawing sheet, it will be appreciated that crocheting using gravity and that the crotchet hook may be oriented horizontally in operation.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

It should be understood that the controller 120 as described herein may include a conventional processing apparatus known in the art, which may be capable of executing preprogrammed instructions stored in an associated memory, all performing in accordance with the functionality described herein. The controller 120 may be configured to perform various functions, including those described in greater detail herein, with appropriate programming instructions and/or code embodied in software, hardware, and/or other medium. To the extent that the methods described herein are embodied in software, the resulting software can be stored in an associated memory and can also constitute means for performing such methods. Such a system or processor may further be of the type having ROM, RAM, and/or a combination of non-volatile and volatile memory so that any software may be stored and yet allow storage and processing of dynamically produced data and/or signals.

The controller 120 may include a memory on which computer-executable instructions may be stored, where the instructions may define operations and may be executable by one or more devices such as those listed herein. Computer-executable instructions may be compiled or interpreted from computer programs created using a variety of programming languages and/or technologies.

A memory may include, in general, any computer-readable medium (also referred to as a processor-readable medium) that may include any non-transitory (e.g., tangible) medium that provides instructions that may be read by a computer (e.g., by controller 120). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including radio waves, metal wire, fiber optics, and the like, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All matter contained in the above description or shown in the accompanying drawings shall be interpreted as illustrative only and not limiting. Changes in detail or structure may be made without departing from the present disclosure.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary. Further, the use of "at least one of" is intended to be inclusive, analogous to the term and/or. As an example, the phrase "at least one of A, B and C" includes A only, B only, C only, or any combination thereof (e.g. AB, AC. BC or ABC). Additionally, use of adjectives such as first, second, etc. should be read to be interchangeable unless a claim recites an explicit limitation to the contrary.

What is claimed is:

1. A method of additively manufacturing a metal product, comprising:
    providing an additive manufacturing system (AM system) including an additive manufacturing unit (AM unit) and a mechanical unit;
    determining a set of parameters to produce a product having the at least one of a desired property and a desired characteristic;
    performing a unified additive-deformation-machining (ADM) process with the AM system to produce the product having the at least one of the desired property and the desired characteristic;
    producing a bead of material along at least a portion of a planned path via performing an application subprocess of the unified ADM process;
    deforming a material of the bead via performing a deformation subprocess of the unified ADM process to modify at least one of a characteristic and a property of the material of the bead;
    detecting a temperature of the bead of material;
    actively monitoring the detected temperature;
    automatically and dynamically adjusting the determined set of parameters based on the detected temperature; and
    coordinating performance of the application subprocess and the deformation subprocess during the unified ADM process based on the determined set of parameters to produce the product having the at least one of the desired property and the desired characteristic;
    wherein performing the unified ADM process with the AM system includes:
        performing the application subprocess with the AM unit; and
        performing the deformation subprocess with the mechanical unit to provide the material of the bead with at least one of the desired property and the desired characteristic;
    wherein performing the application subprocess with the AM unit includes:
        applying a feed material with a feed material applicator of a feed mechanism of the AM unit;
        melting the applied feed material into a molten material pool to produce the bead of material; and
        applying a supplemental material to at least one of the applied feed material and the molten material pool, the supplemental material applied with a supplemental material applicator of a supplemental feed mechanism of the AM unit.

2. The method of claim 1, further comprising performing the application subprocess and the deformation subprocess simultaneously during at least a portion of the unified ADM process.

3. The method of claim 1, further comprising:
    machining at least one surface of the bead of material via performing a machining subprocess of the unified ADM process;
    coordinating performance of the machining subprocess with the application subprocess and the deformation subprocess; and
    wherein machining at least one surface of the bead of material includes removing material from the bead, providing the bead with a desired geometry, and providing the at least one surface of the bead with a desired surface finish.

4. The method of claim 1, wherein:
    deforming the material of the bead includes deforming the material of the bead when the temperature of the material of the bead is within a determined deformation temperature range; and
    automatically and dynamically adjusting the determined set of parameters based on the detected temperature includes adjusting at least one determined parameter such that the temperature of the bead of material in a region that is being deformed is within the determined deformation temperature range.

5. The method of claim 1, further comprising, prior to deforming the material of the bead, actively cooling the bead of material via providing a stream of air onto the bead of material.

6. The method of claim 1, wherein:
    the AM system further includes a stage and a toolhead;
    the AM unit includes a feed mechanism including a feed material applicator that is adjustably connected to the toolhead;
    the mechanical unit includes a deformation tool that is adjustably connected to the toolhead; and
    performing the unified ADM process with the AM system further includes moving the toolhead relative to the stage to move the AM unit and the mechanical unit along the planned path such that the deformation tool follows behind the feed material applicator at a trail distance.

7. The method of claim 1, wherein:
    the mechanical unit includes a deformation tool and a machining tool;
    performing the unified ADM process with the AM system further includes:
        machining at least one surface of the bead of material via performing a machining subprocess with the mechanical unit; and
        moving the feed material applicator, the deformation tool, and the machining tool along the planned path such that the machining tool follows behind the deformation tool, which follows behind the feed material applicator; and
    performing the machining subprocess with the mechanical unit includes at least one of providing the bead with a desired geometry, providing the at least one surface of the bead with a desired surface finish, and removing material from the bead with the machining tool of the mechanical unit.

8. The method of claim 1, wherein:
    performing the deformation subprocess with the mechanical unit includes plastically deforming the material of the bead with a deformation tool of the mechanical unit; and
    determining the set of parameters further includes:
        determining a deformation temperature range in which the material of the bead is to be deformed to provide the material of the bead with the at least one of the desired property and the desired characteristic; and
determining a trail distance at which the deformation tool is to follow the feed material applicator along the planned path for the deformation tool to deform the material of the bead when the temperature of the material of the bead is within the determined deformation temperature range.

9. The method of claim 1, wherein the temperature of the bead of material is directly detected via a temperature detection mechanism.

10. The method of claim 9, wherein the temperature detection mechanism is at least one of an inferred camera and a temperature sensor.

11. A method of additively manufacturing a metal product, comprising:
providing an additive manufacturing system (AM system) including a toolhead, an additive manufacturing unit (AM unit), a mechanical unit, and at least one actuator, the AM unit including a feed material applicator configured to apply a feed material, a supplemental material applicator configured to apply a supplemental material, and a melting mechanism, the toolhead including a track assembly to which at least a portion of the mechanical unit is adjustably connected, the portion of the mechanical unit adjustable along the track assembly via actuation of the at least one actuator; and
performing a unified additive-deformation-machining (ADM) process with the AM system to produce a product having the at least one of a desired property and a desired characteristic;
wherein performing the unified ADM process with the AM system includes:
performing an application subprocess of the unified ADM process with the AM unit;
performing a deformation subprocess of the unified ADM process with the mechanical unit; and
coordinating performance of the application subprocess and the deformation subprocess during the unified ADM process to produce the product having the at least one of the desired property and the desired characteristic;
wherein performing the application subprocess includes:
applying the feed material with the feed material applicator;
melting, via the melting mechanism, the applied feed material into a molten material pool to produce a bead of material along at least a portion of a planned path; and
applying, via the supplemental material applicator, the supplemental material to at least one of the applied feed material and the molten material pool; and
wherein performing the deformation subprocess includes deforming a material of the bead to modify at least one of a characteristic and a property of the material of the bead.

12. The method of claim 11, further comprising:
receiving, via a controller of the AM system, at least one user input; and
determining, via the controller, a set of parameters to produce the product having the at least one of the desired property and the desired characteristic based on the at least one user input.

13. The method of claim 12, wherein the at least one user input includes at least one of:
a composition of at least one material utilized during the application subprocess;
the desired property of the product that is to be produced; and
the desired characteristic of the product that is to be produced.

14. The method of claim 12, wherein:
the determined set of parameters includes at least one application parameter, at least one melting parameter, and at least one deformation parameter;
the at least one application parameter includes at least one of an AM unit line speed and a material feed speed;
the at least one melting parameter includes at least one of a voltage, a current, a beam geometry, and a beam orientation; and
the at least one deformation parameter includes at least one of a deformation temperature range, a trail distance for a deformation tool, a cooling rate of a molten material pool that forms the bead, and a deformation tool line speed.

15. The method of claim 12, further comprising:
detecting a temperature of the bead of material with a temperature detection mechanism of the AM system, the temperature detection mechanism adjustably connected to the track assembly of the toolhead and adjustable along the track assembly via actuation of the at least one actuator;
communicating the detected temperature to the controller;
actively monitoring the detected temperature; and
automatically and dynamically adjusting the determined set of parameters based on the detected temperature.

16. The method of claim 11, wherein performing the unified ADM process with the AM system further includes:
determining, via a controller of the AM system, a first set of parameters to produce a first region of the product having at least one of a desired first property and a desired first characteristic;
determining, via the controller, a second set of parameters to produce a second region of the product having at least one of a desired second property and a desired second characteristic;
producing the first region of the product via coordinating performance of the application subprocess and the deformation subprocess based on the first set of parameters during a first portion of the unified ADM process; and
producing the second region of the product via coordinating performance of the application subprocess and the deformation subprocess based on the second set of parameters during a second portion of the unified ADM process.

17. A method of additively manufacturing a metal product, comprising providing an additive manufacturing system (AM system) including an additive manufacturing unit (AM unit) and a mechanical unit, and performing a unified additive-deformation-machining (ADM) process with the AM system to produce a product having at least one of a desired property and a desired characteristic, wherein:
performing the unified ADM process includes:
performing an application subprocess of the unified ADM process;
performing a deformation subprocess of the unified ADM process; and
coordinating performance of the application subprocess and the deformation subprocess during the unified ADM process to produce the product having the at least one of the desired property and the desired characteristic;
performing the application subprocess includes:
   producing a bead of material along at least a portion of a planned path;
   applying a feed material with a feed material applicator of a feed mechanism of the AM unit;
   melting the applied feed material into a molten material pool to produce the bead of material; and
   applying a supplemental material to at least one of the applied feed material and the molten material pool, the supplemental material applied with a supplemental material applicator of a supplemental feed mechanism of the AM unit; and
performing the deformation subprocess includes deforming a material of the bead, via performing a friction stirring process, to modify at least one of i) a characteristic of the material of the bead to the desired characteristic and ii) a property of the material of the bead to the desired property.

\* \* \* \* \*